US008957988B2

(12) United States Patent
Wexler et al.

(10) Patent No.: US 8,957,988 B2
(45) Date of Patent: Feb. 17, 2015

(54) APPARATUS FOR PROCESSING IMAGES TO PROLONG BATTERY LIFE

(71) Applicants: Yonatan Wexler, Jerusalem (IL); Amnon Shashua, Mevaseret Zion (IL)

(72) Inventors: Yonatan Wexler, Jerusalem (IL); Amnon Shashua, Mevaseret Zion (IL)

(73) Assignee: OrCam Technologies Ltd., Jerusalem (IL)

( * ) Notice: Subject to any disclaimer, the term of this patent is extended or adjusted under 35 U.S.C. 154(b) by 0 days.

(21) Appl. No.: 14/161,332

(22) Filed: Jan. 22, 2014

(65) Prior Publication Data
US 2014/0204235 A1    Jul. 24, 2014

Related U.S. Application Data

(60) Provisional application No. 61/755,538, filed on Jan. 23, 2013, provisional application No. 61/903,705, filed on Nov. 13, 2013.

(51) Int. Cl.
*H04N 5/76* (2006.01)
*H04N 5/232* (2006.01)
*G06F 1/16* (2006.01)
*G06F 1/26* (2006.01)

(52) U.S. Cl.
CPC ....... *H04N 5/23241* (2013.01); *H04N 5/23222* (2013.01); *G06F 1/163* (2013.01); *G06F 1/263* (2013.01); *G06F 1/266* (2013.01)
USPC ........................................ 348/231.6; 348/372

(58) Field of Classification Search
CPC .... H04N 5/23241; H04N 5/225; H04N 5/772
USPC .......................... 348/231.3, 231.5, 231.6, 372
See application file for complete search history.

(56) References Cited

U.S. PATENT DOCUMENTS

| | | | |
|---|---|---|---|
| 6,522,873 B1 | 2/2003 | Moles et al. |
| 7,424,200 B2 | 9/2008 | Nishijima et al. |
| 7,557,836 B2 | 7/2009 | Suemoto |
| 8,255,720 B1 | 8/2012 | Conway |
| 8,564,714 B2 | 10/2013 | Umeyama |
| 8,578,185 B2 | 11/2013 | Azuma et al. |

(Continued)

OTHER PUBLICATIONS

U.S. Appl. No. 14/161,366, filed Jan. 22, 2014, entitled "Apparatus for Adjusting Image Capture Settings,".

(Continued)

*Primary Examiner* — Sinh Tran
*Assistant Examiner* — Zhenzhen Wu
(74) *Attorney, Agent, or Firm* — Finnegan, Henderson, Farabow, Garrett & Dunner, LLP

(57) ABSTRACT

A device and method are provided for processing mages to prolong battery life. In one implementation, a wearable apparatus may include a wearable image sensor configured to capture a plurality of images from an environment of a user. The wearable apparatus may also include at least one processing device configured to, in a first processing-mode, process representations of the plurality of images to determine a value of at least one capturing parameter for use in capturing at least one subsequent image, and in a second processing-mode, process the representations of the plurality of images to extract information. In addition, the at least one processing device may operate in the first processing-mode when the wearable apparatus is powered by a mobile power source included in the wearable apparatus and may operate in the second processing-mode when the wearable apparatus is powered by an external power source.

29 Claims, 15 Drawing Sheets

(56) References Cited

U.S. PATENT DOCUMENTS

| | | |
|---|---|---|
| 2001/0005686 A1 | 6/2001 | Naito et al. |
| 2009/0051785 A1* | 2/2009 | Kamada et al. ............ 348/231.5 |
| 2012/0143760 A1* | 6/2012 | Abulafia et al. ................. 705/44 |
| 2012/0212593 A1* | 8/2012 | Na'Aman et al. .............. 348/62 |
| 2012/0249018 A1 | 10/2012 | West |
| 2013/0128051 A1 | 5/2013 | Velipasalar et al. |
| 2013/0271584 A1 | 10/2013 | Wexler et al. |
| 2013/0303225 A1 | 11/2013 | Maguire |

OTHER PUBLICATIONS

Michael, Martin Peter, "Energy Awareness for Mobile Devices," Paper for Research Seminar on Energy Awareness, 2005, pp. 1-8, University of Helsinki.

LIKAMWA, Robert et al., "Energy Characterization and Optimization of Image Sensing Toward Continuous Mobile Vision," MobiSys 13, Jun. 25-28, 2013, 13 pp, Taipei, Taiwan.

* cited by examiner

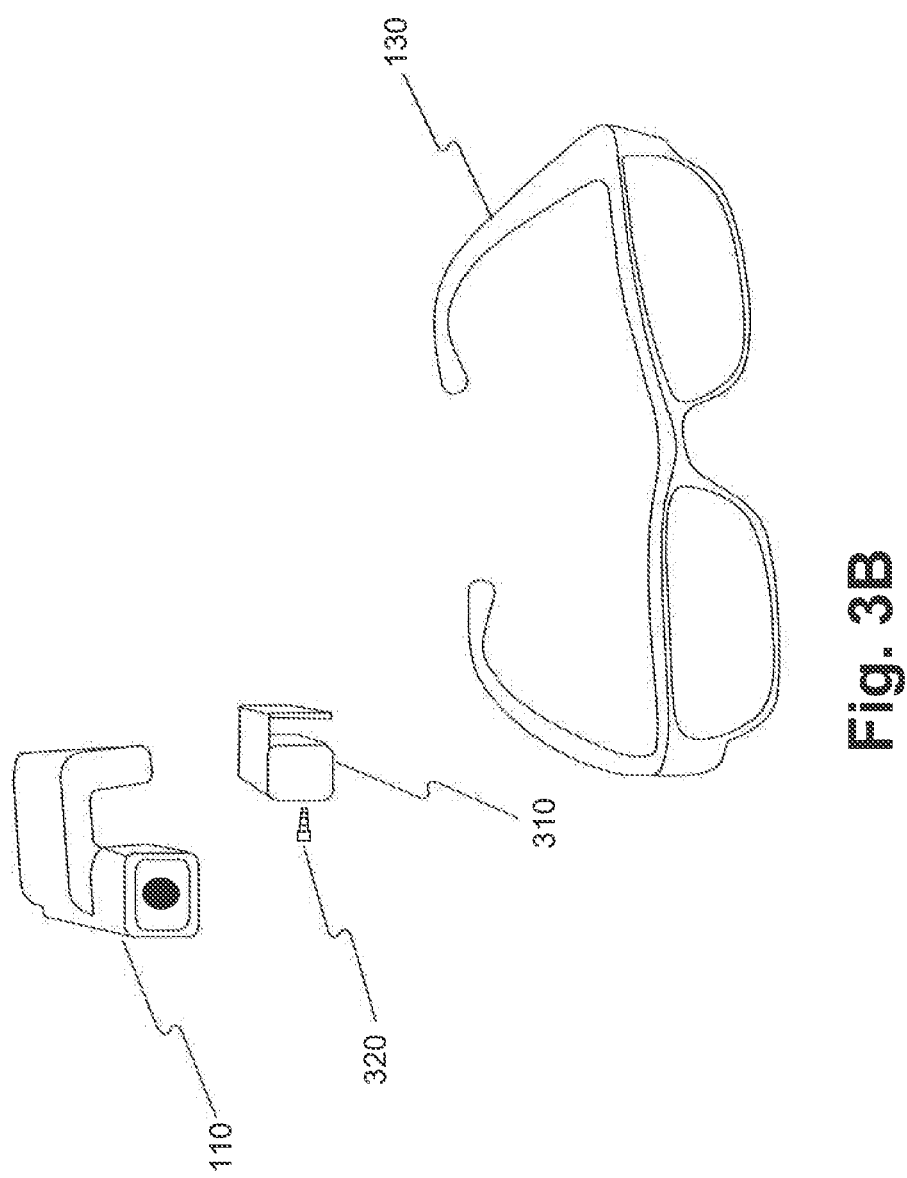

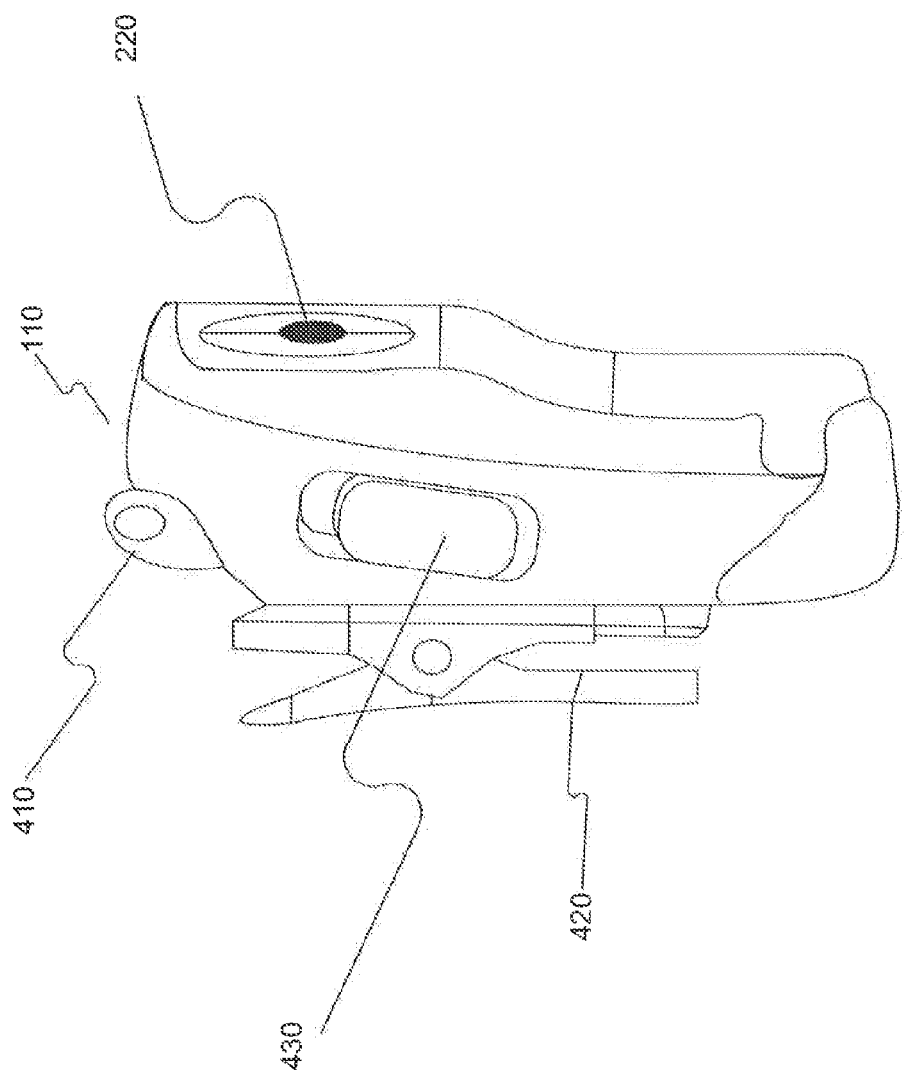

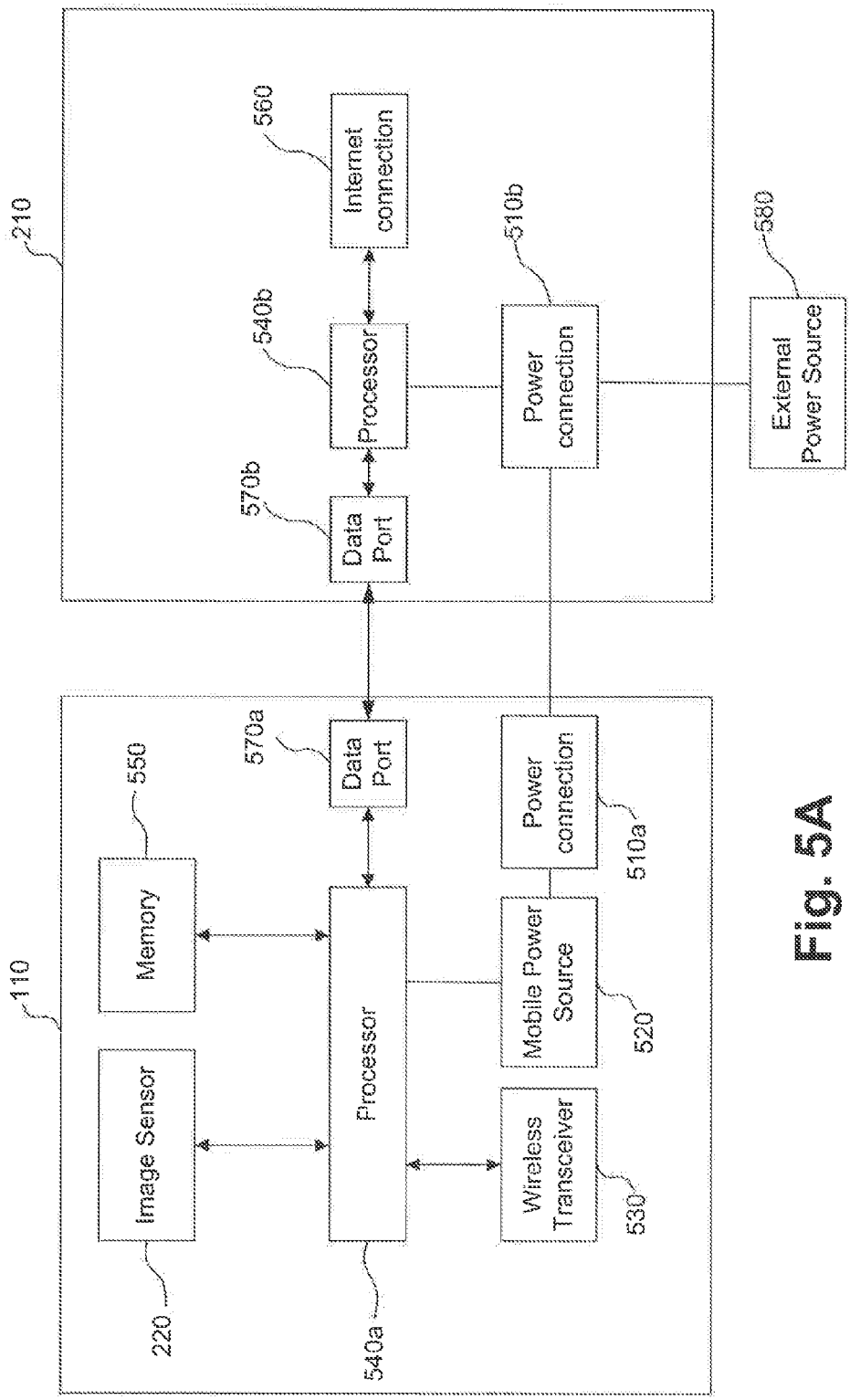

APPARATUS FOR PROCESSING IMAGES TO PROLONG BATTERY LIFE

CROSS REFERENCES TO RELATED APPLICATIONS

This application claims the benefit of priority of U.S. Provisional Patent Application No. 61/755,538, filed on Jan. 23, 2013, and U.S. Provisional Patent Application No. 61/903,705, filed on Nov. 13, 2013, both of which are incorporated herein by reference in their entirety.

BACKGROUND

I. Technical Field

This disclosure generally relates to devices and methods for capturing and processing images from an environment of a user. More particularly, this disclosure relates to wearable devices and methods for automatically capturing and processing images from the environment of the user.

II. Background Information

Today, technological advancements make it possible for wearable devices to automatically capture images and store information that is associated with the captured images. Digitally recording aspects and personal experiences of someone's life is typically called "lifelogging." Some people log their life so they can retrieve moments from past activities, for example, social events, trips, etc. Lifelogging, however, may also have significant benefits in other fields (e.g., business, health care, and social research).

In a business, employees can use a lifelogging apparatus to record meetings and store information that may have financial value. For example, a lifelogging apparatus can help a door-to-door salesman to remember potential clients. In the alternative, an employer may require his employees to wear lifelogging apparatuses during their working hours to monitor and/or record their activity for quality assurance purposes, or for insurance liability purposes.

In the health care field, a lifelogging apparatus can help people who have severe memory loss or Alzheimer's, for example, by using reminiscence therapy. In reminiscence therapy, the lifelogging user reviews and talks about the day with someone, such as a caregiver. Reviewing and discussing information collected by the lifelogging apparatus may assist the user to remember events that took place during a particular day. In addition, some lifelogging apparatuses may include various biological sensors that can sense and record biological data, such as, body temperature, skin conductance, body heat, and so forth. This kind of lifelogging apparatuses can provide valuable information for diagnosing a medical condition of the user.

In social research, lifelogging apparatuses can provide information to form a database that describes social habits or preferences. For example, the database can indicate that people prefer a first place more than a second place. Accordingly, a recommendation system may use the database to suggest that the first place is worth visiting more than the second place. The recommendation system can provide rankings of a variety of places (e.g., restaurants, bars, etc.) or may make other recommendations (e.g., recommended movies, music, etc.).

Design challenges relate to the size and performance of the lifelogging apparatus. On one hand, the lifelogging apparatus should be small and light, so it can be easily worn. On the other hand, the lifelogging apparatus should have long battery-life and enough storage space, so it can be worn for a long period of time during the day (e.g., for 12 hours, or 24 hours).

Therefore, there is a need for light wearable apparatuses and methods for automatically capturing images and storing information in a manner that preserves battery-life and storage space.

SUMMARY

Embodiments consistent with the present disclosure provide an apparatus and methods for automatically capturing and processing images from an environment of a user.

In accordance with a disclosed embodiment, a wearable apparatus for capturing and processing images is disclosed. The wearable apparatus may include a wearable image sensor configured to capture a plurality of images from an environment of a user. The wearable apparatus may also include at least one processing device configured to, in a first processing-mode, process representations of the plurality of images to determine a value of at least one capturing parameter for use in capturing at least one subsequent image, and in a second processing-mode, process the representations of the plurality of images to extract information. In addition, the at least one processing device may operate in the first processing-mode when the wearable apparatus is powered by a mobile power source included in the wearable apparatus and may operate in the second processing-mode when the wearable apparatus is powered by an external power source.

In accordance with another disclosed embodiment, a system for capturing and processing images is disclosed. The system may include a wearable apparatus including an image sensor, a memory, and a first processing device. The wearable apparatus may be powered by a mobile power source included in the wearable apparatus. The wearable apparatus may be configured to capture a plurality of images from an environment of a user, store representations of the plurality of images in the memory, and process the representations of the plurality of images to determine a value of at least one capturing parameter for use in capturing at least one subsequent image. The system may also include a managing apparatus. The managing apparatus may include a second processing device. Further, when the managing apparatus communicates with the wearable apparatus, the managing apparatus may be configured to process the representations of the plurality of images to extract information from at least one of the representations of the plurality of images stored in the memory, and delete the at least one of the representations of the plurality of images from the memory.

Consistent with another disclosed embodiment, a wearable apparatus for capturing and processing images is provided. The wearable apparatus may include a wearable image sensor configured to capture a plurality of images from an environment of a user, and a memory configured to store representations of the plurality of images. The wearable apparatus may also include at least one processing device configured to, when the wearable apparatus is powered by a mobile power source included in the wearable apparatus, process the representations of the plurality of images to determine a value of at least one capturing parameter for use in capturing at least one subsequent image. The at least one processing device may be further configured to communicate with a managing apparatus. The managing apparatus may be configured to process the representations of the plurality of images to extract information from at least one of the representations of the plurality of images stored in the memory and delete the at least one of the representations of the plurality of images from the memory.

Consistent with other disclosed embodiments, non-transitory computer-readable storage media may store program instructions, which are executed by at least one processor and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 3B is an exploded view of FIG. 3A;

FIG. 4B is a schematic illustration of the example of the wearable apparatus shown in FIG. 1B from a second viewpoint;

FIG. 5A is a block diagram illustrating an example of the components of a wearable apparatus according to a first embodiment;

DETAILED DESCRIPTION

Figure 1A:
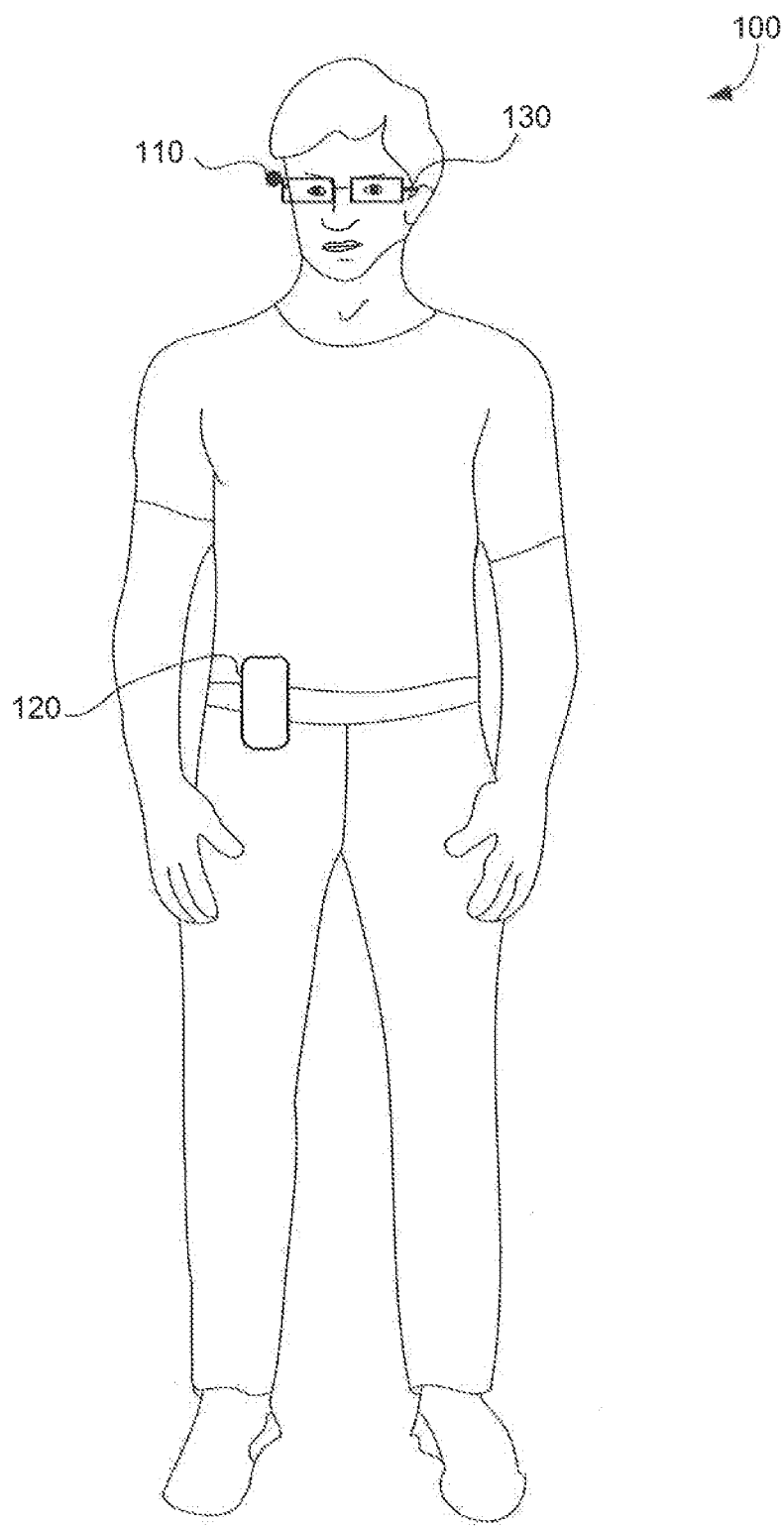
FIG. 1A is a schematic illustration of an example of a user wearing a wearable apparatus according to a first embodiment.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Disclosed embodiments provide wearable apparatuses and methods for capturing and processing images. One example of the disclosed embodiments is a wearable apparatus that includes a camera configured to capture real-time image data from an environment of the user. The wearable apparatus may use program instructions to determine when to capture images. Accordingly, the wearable apparatus may automatically capture images from the user's environment based at least on the program instructions. The wearable apparatus also may include a processing unit configured to process the real-time image data and to make real-time decisions about the data. The processing unit can determine, for example, which type of data to store (e.g., video, audio, or still images), which images to store (e.g., avoid storing repetitive images), which image resolution to use (e.g., using high-resolution when capturing a family member), and so on.

FIG. 1A illustrates a user 100 wearing an apparatus 110 that is physically connected to glasses 130, consistent with a first embodiment. Glasses 130 may be prescription glasses, magnifying glasses, non-prescription glasses, safety glasses, sunglasses, etc. In some embodiments, apparatus 110 may include an image sensor (not shown in FIG. 1A) for capturing real-time image data of the field-of-view of user 100. The term "image data" includes any form of data retrieved from optical signals in the near-infrared, infrared, visible, and ultraviolet spectrums. The image data may include video clips and/or photographs.

Apparatus 110 may communicate wirelessly or via a wire with a computing device 120. Computing device 102 may include, for example, a smartphone or a dedicated processing unit, which is portable (e.g., can be carried in a pocket of user 100). A person skilled in the art can appreciate that different types of computing devices and arrangements of devices may implement the functionality of the disclosed embodiments. Accordingly, in other implementations, computing device 120 may not be portable (e.g., a Personal Computer (PC), an Internet server, etc.).

Figure 1B:
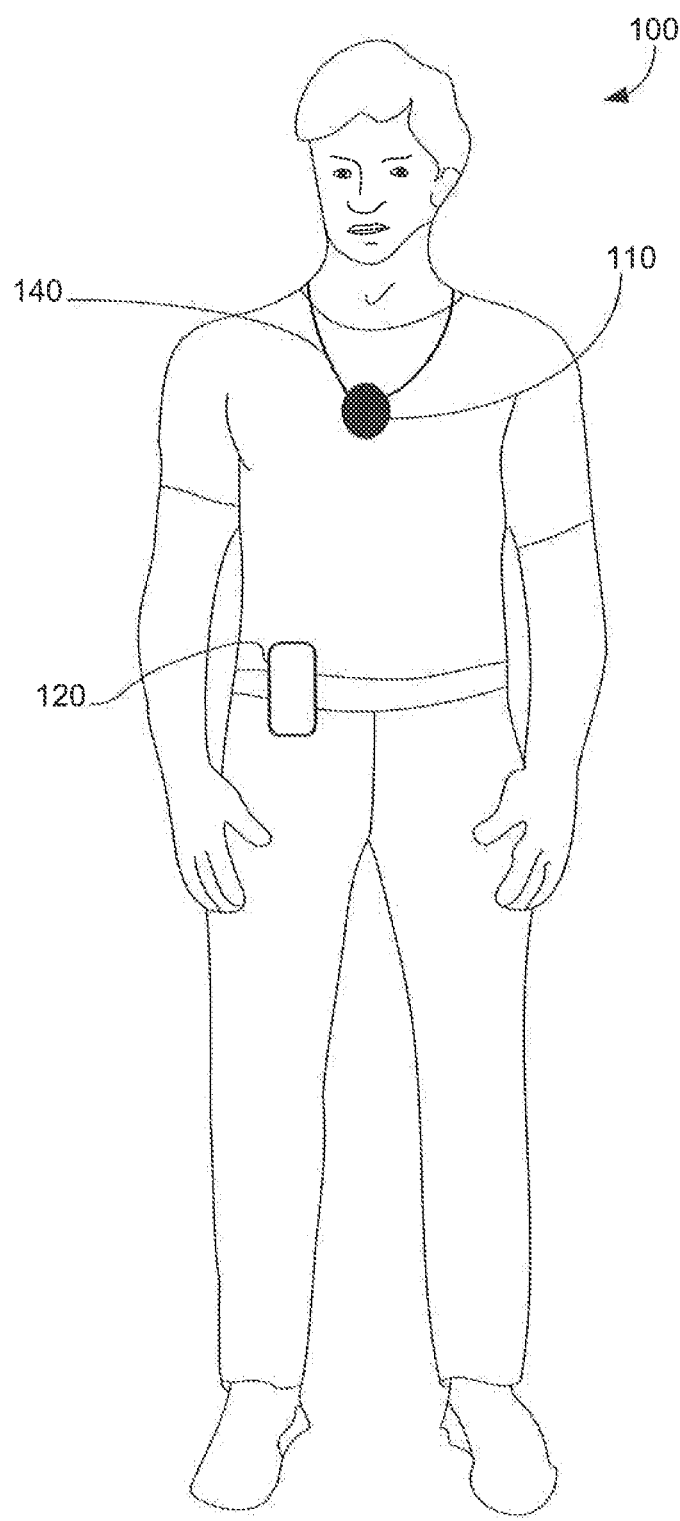
FIG. 1B is a schematic illustration of an example of the user wearing a wearable apparatus according to a second embodiment.

FIG. 1B illustrates user 100 wearing apparatus 110 that is physically connected to a necklace 140, consistent with a second embodiment. The second embodiment of apparatus 110 may be suitable for users that do not wear glasses some or all of the time. In this embodiment, user 100 can easily wear apparatus 110, and take it off.

Figure 1C:
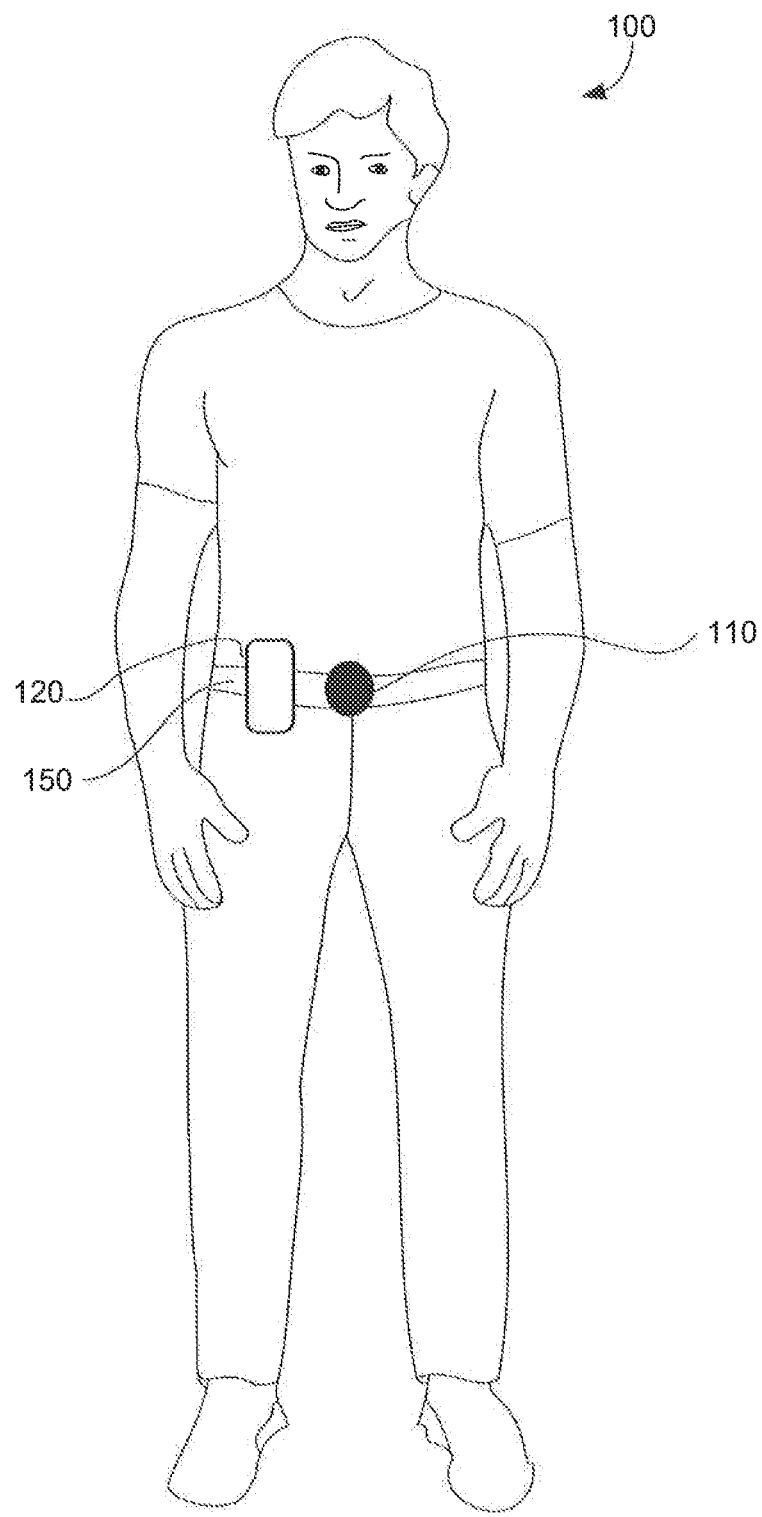
FIG. 1C is a schematic illustration of an example of the user wearing a wearable apparatus according to a third embodiment.

FIG. 1C illustrates user 100 wearing apparatus 110 that is physically connected to a belt 150, consistent with a third embodiment. The third embodiment of apparatus 110 may be designed as a belt buckle. Alternatively, apparatus 110 may include a clip for attaching to various clothing articles, such as belt 150.

Figure 1D:
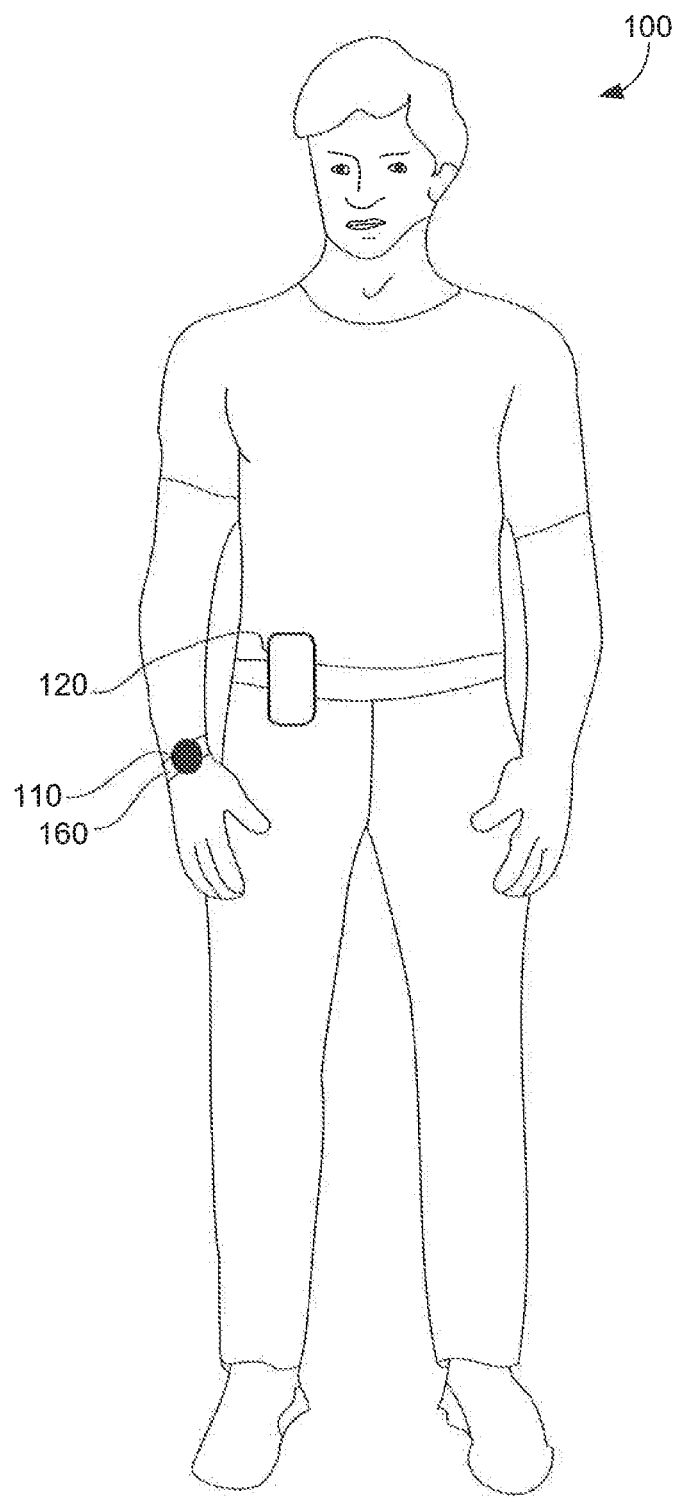
FIG. 1D is a schematic illustration of an example of the user wearing a wearable apparatus according to a fourth embodiment.

FIG. 1D illustrates user 100 wearing apparatus 110 that is physically connected to a wrist strap 160, consistent with a fourth embodiment. Although, the aiming direction of apparatus 110, according to this embodiment, may not match the field-of-view of user 100, apparatus 110 may include various biological sensors that can sense and record biological data, such as, body temperature, skin conductance, body heat, and so forth.

Figure 2:
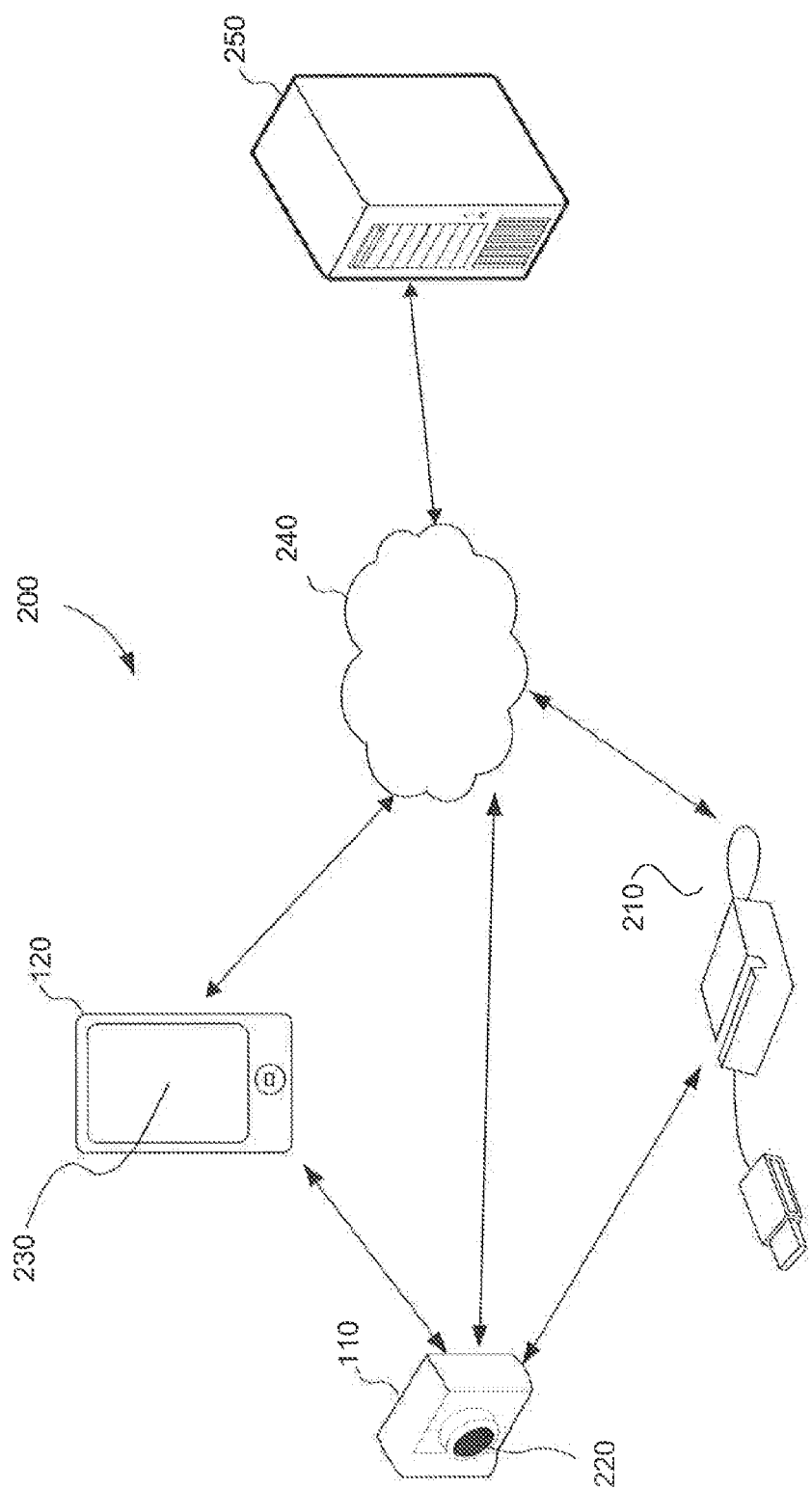
FIG. 2 is a schematic illustration of the communication paths between a wearable apparatus and a server.

FIG. 2 is a schematic illustration of a system 200 that shows the communication paths between apparatus 110 and a server 250 via a network 240, consistent with disclosed embodiments. As discussed above, apparatus 110 may include an image sensor 220 for capturing image data. The term "image sensor" refers to a device capable of detecting and converting optical signals in the near-infrared, infrared, visible, and ultraviolet spectrums into electrical signals. The electric signals may be used to form an image or a video stream based on the detected signal. In some cases, image sensor 220 may be part of a camera included in apparatus 110.

Network 240 provides communications between the various components in system 200, such as apparatus 110 and server 250. In addition, the components in system 200 may access legacy systems (not shown) via network 240, or may directly access legacy systems, data stores, or other network applications. Network 240 may be a shared, public, or private network, may encompass a wide area or local area, and may be implemented through any suitable combination of wired and/or wireless communication networks. Network 240 may further comprise an intranet or the Internet. Further, communication between apparatus 110 and server 250 may be accomplished through any suitable communication channels, such as, for example, a telephone network, an extranet, an intranet, the Internet, satellite communications, offline communications, wireless communications, transponder communications, a local area network (LAN), a wide area network (WAN), and a virtual private network (VPN).

As shown in FIG. 2, apparatus 110 may transfer data to server 250 via three different communication paths. In one embodiment, the data being transferred to server 250 includes some of the image data captured by apparatus 110. Alternatively or additionally, the data being transferred to server 250 may include information that has been extracted from the image data.

The first communication path between apparatus 110 and server 250 includes a station, e.g., station 210. The term "station" refers to any device capable of charging apparatus 110. For example, station 210 may be a charging station compatible with apparatus 110. Alternatively, station 210 may be a regular PC connectable to apparatus 110 by a wire connection. Station 210 may communicate with server 250 via network 240. When apparatus 110 is connected to station 210, station 210 may charge the wearable apparatus' power source and retrieve data stored in the wearable apparatus' memory. In some embodiments, station 210 may process the image data retrieved from the wearable apparatus' memory and extract information. For example, station 210 may process the image data and extract information identifying occurrences of different products in the environment of user 100.

The second communication path between apparatus 110 and server 250 is via network 240. Apparatus 110 may establish a connection to network 240 autonomously, for example, using a wireless module (e.g., Wi-Fi, cellular). In some embodiments, apparatus 110 may use the wireless module when being connected to an external power source, to prolong battery life. In other embodiments, apparatus 110 may use a Wi-Fi connection to transfer previously captured image data to server 250. For example, transferring previously captured image data to server 250 may help to maintain available storage space in a memory of apparatus 110.

The third communication path between apparatus 110 and server 250 includes computing device 120. The term "computing device" refers to a device including a processing unit and having computing capabilities. One example of computing device is a PC configured to communicate with server 250. Another example of computing device 120 is a smartphone having a display 230. Apparatus 110 can connect to computing device 120 via any known wireless standard (e.g., Wi-Fi, Bluetooth®), or via a wired connection. In an embodiment in which computing device 120 is a smartphone, computing device 120 may have a dedicated application installed therein. For example, user 100 may view on display 230 data (e.g., images, video clips, extracted information, etc.) that originate from apparatus 110. In addition, user 100 may select part of the data for storage in server 250.

In some embodiments, apparatus 110 may also receive information and/or instructions from server 250. For example, server 250 can retrieve information from different data sources (e.g., the user's calendar, the user's Facebook® account) and instruct apparatus 110 on specific days (e.g., the user's birthday), or at specific times (e.g., important meetings) to take images at a higher resolution than usual. In one example, apparatus 110 includes a Wi-Fi transceiver and, in order to save battery life, apparatus 110 may use the Wi-Fi transceiver to receive information and/or instructions from server 250 when apparatus 110 is connected to an external power source.

Figure 3A:
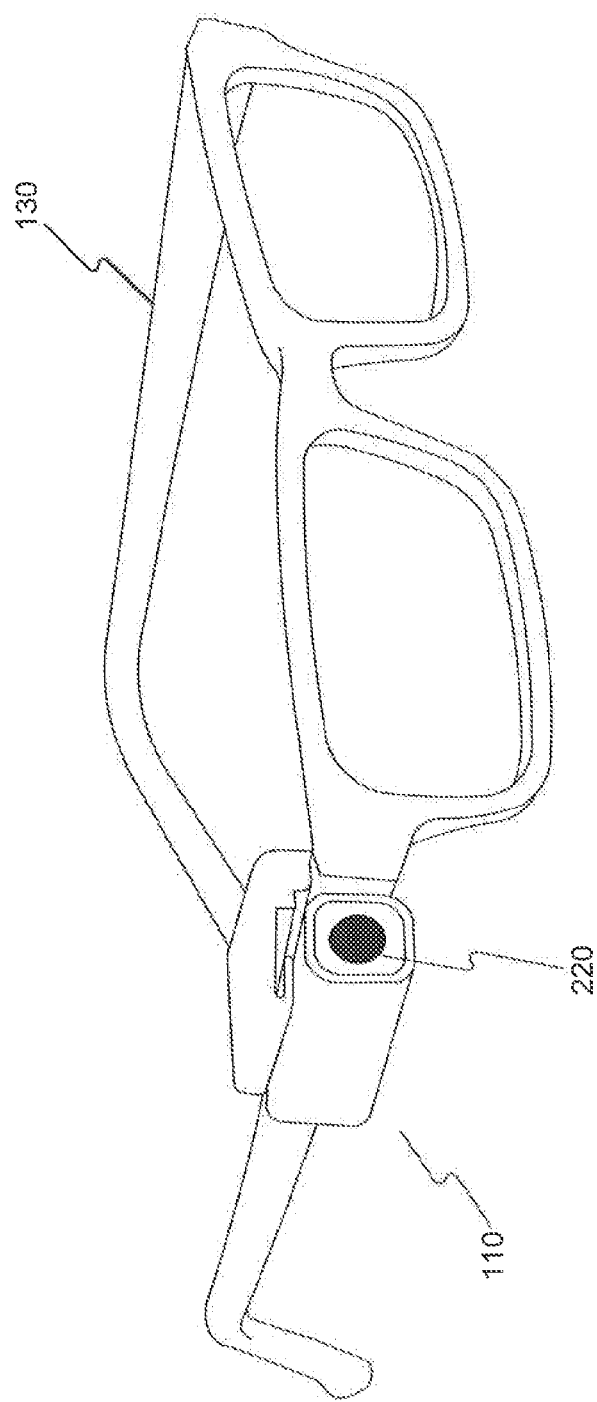
FIG. 3A is a schematic illustration of an example of the wearable apparatus shown in FIG. 1A.

FIG. 3A is a schematic illustration of an example of apparatus 110. As discussed in connection with FIG. 1A, apparatus 110 may attach to glasses 130. In one embodiment, apparatus 110 may be associated with a structure (not shown in FIG. 1A) that enables easy detaching and reattaching of apparatus 110 to glasses 130. In some embodiments, when apparatus 110 attaches to glasses 130, image sensor 220 acquires a set aiming direction without the need for directional calibration. The set aiming direction of image sensor 220 may substantially coincide with the field-of-view of user 100. For example, a camera associated with image sensor 220 may be installed within apparatus 110 in a predetermined angle in a position facing slightly downwards (e.g., 5-15 degrees from the horizon). Accordingly, the set aiming direction of image sensor 220 may substantially match the field-of-view of user 100.

FIG. 3B is an exploded view of the components of the embodiment discussed regarding FIG. 3A. Attaching apparatus 110 to glasses 130 may take place in the following way. Initially, a support 310 may be mounted on glasses 130 using a screw 320, in the side of support 310. Then, apparatus 110 may be clipped on support 310 such that it is aligned with the field-of-view of user 100. The term "support" includes any device or structure that enables detaching and reattaching of a device including a camera to a pair of glasses or to another object (e.g., a helmet). Support 310 may be made from plastic (e.g., polycarbonate), metal (e.g., aluminum), or a combination of plastic and metal (e.g., carbon fiber graphite). Support 310 may be mounted on any kind of glasses (e.g., eyeglasses, sunglasses, 3D glasses, safety glasses, etc.) using screws, bolts, snaps, or any fastening means used in the art.

In some embodiments, support 310 may include a quick release mechanism for disengaging and reengaging apparatus 110. For example, support 310 and apparatus 110 may include magnetic elements. As an alternative example, support 310 may include a male latch member and apparatus 110 may include a female receptacle. In other embodiments, support 310 can be an integral part of a pair of glasses, or sold separately and installed by an optometrist. For example, support 310 may be configured for mounting on the arms of glasses 130 near the frame front, but before the hinge. Alternatively, support 310 may be configured for mounting on the bridge of glasses 130.

Figure 4A:
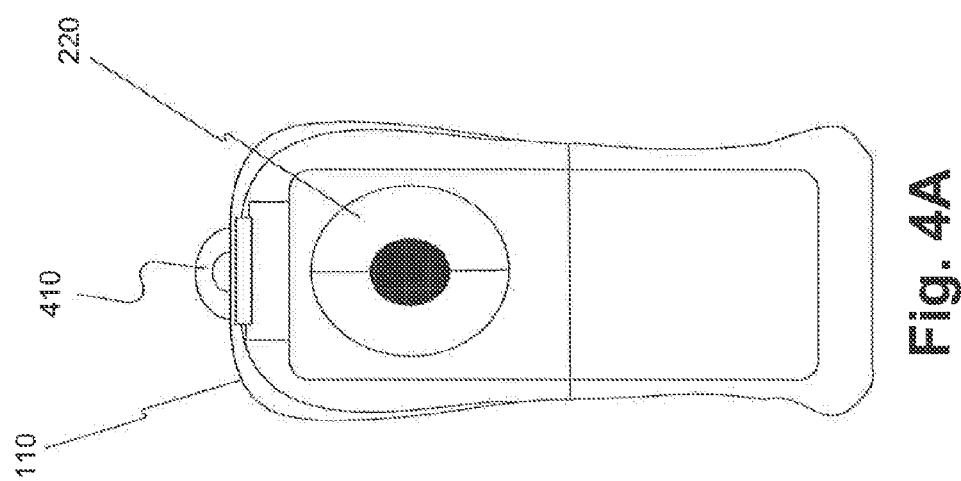
FIG. 4A is a schematic illustration of an example of the wearable apparatus shown in FIG. 1B from a first viewpoint.

FIG. 4A is a schematic illustration of an example of a second embodiment of apparatus 110 from a first viewpoint. The viewpoint shown in FIG. 4A is from the front of apparatus 110. Apparatus 110 includes an image sensor 220, a clip (not shown), a function button (not shown) and a hanging ring 410 for attaching apparatus 110 to, for example, necklace 140, as shown in FIG. 1B. When apparatus 110 hangs on necklace 140, the aiming direction of image sensor 220 may not fully coincide with the field-of-view of user 100, but the aiming direction would still correlate with the field-of-view of user 100.

FIG. 4B is a schematic illustration of the example of a second embodiment of apparatus 110, from a second viewpoint. The viewpoint shown in FIG. 4B is from a side orientation of apparatus 110. In addition to hanging ring 410, as shown in FIG. 4B, apparatus 110 may further include a clip 420. User 100 can use clip 420 to attach apparatus 110 to a shirt or belt 150, as illustrated in FIG. 1C. Clip 420 may provide an easy mechanism for disengaging and reengaging apparatus 110 from different articles of clothing. In other embodiments, apparatus 110 may include a female receptacle for connecting with a male latch of a car mount or universal stand.

In one embodiment, apparatus 110 includes a function button 430 for enabling user 100 to provide input to apparatus 110. Function button 430 may accept different types of tactile input (e.g., a tap, a click, a double-click, a long press, a right-to-left slide, a left-to-right slide). In some embodiments, each type of input may be associated with a different action. For example, a tap may be associated with the function of taking a picture, while a right-to-left slide may be associated with the function of recording a video.

FIG. 5A is a block diagram illustrating the components of apparatus 110 according to a first embodiment in which apparatus 110 communicates with server 250 via station 210. Specifically, FIG. 5A depicts an embodiment in which apparatus 110 communicates with server 250 in the first communication path, as discussed in connection with FIG. 2.

As shown in FIG. 5A, apparatus 110 includes an image sensor 220, a memory 550, a processor 540a, a wireless transceiver 530, and a mobile power source 520. In other embodiments, apparatus 110 may also include buttons, other sensors such as a microphone, and inertial measurements devices such as accelerometers, magnetometers, temperature sensors, color sensors, light sensors, etc. Apparatus 110 further includes a data port 570a and a power connection 510a for connecting with station 210. As further shown in FIG. 5A, station 210 includes a data port 570b, a power connection 510b, an Internet connection 560, and processor 540b. Station 210 may be connected with external power source 580 for charging mobile power source 520.

Processor 540a and processor 540b, depicted in FIG. 5A, are examples of a processing device. The term "processing device" includes any physical device having an electric circuit that performs a logic operation on input or inputs. For example, processing device may include one or more integrated circuits, microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by the processing device may, for example, be pre-loaded into a memory integrated with or embedded into the processing device or may be stored in a separate memory (e.g., memory 550). Memory 550 may comprise a Random Access Memory (RAM), a Read-Only Memory (ROM), a hard disk, an optical disk, a magnetic medium, a flash memory, other permanent, fixed, or volatile memory, or any other mechanism capable of storing instructions.

Although in the embodiment illustrated in FIG. 5A apparatus 110 includes one processing device (e.g., processor 540a), apparatus 110 may include more than one processing device. Each processing device may have a similar construction or the processing devices may be of differing constructions that are electrically connected or disconnected from each other. For example, the processing devices may be separate circuits or integrated in a single circuit. When more than one processing device is used, the processing devices may be configured to operate independently or collaboratively. The processing devices may be coupled electrically, magnetically, optically, acoustically, mechanically or by other means that permit them to interact.

In some embodiments, processor 540a may process a plurality of images captured from the environment of user 110 to determine different parameters related to capturing subsequent images. Processor 540b can retrieve the plurality of images from memory 550 and process the plurality of images to extract information. For example, processor 540a can determine, based on information derived from captured image data, a value for at least one of the following: an image resolution, a compression ratio, a cropping parameter, frame rate, a focus point, an exposure time, an aperture size, and a light sensitivity. The determined value may be used in capturing at least one subsequent image. Additionally, processor 540b can detect images including at least one commercial descriptor located in the environment of the user, extract information from the detected images, and send the extracted information to server 250.

In another embodiment, processor 540a can change the aiming direction of image sensor 220. For example, when apparatus is attached with clip 420, the aiming direction of image sensor 220 may not coincide with the field-of-view of user 100. Processor 540a may recognize that a user talking with an individual, but the image of that individual is not fully in view, because image sensor 220 is tilted down. Responsive thereto, processor 540a may adjust the aiming direction of image sensor 220.

As shown in FIG. 5A, apparatus 110 includes memory 550. In some embodiments memory 550 may store image data (e.g., images, videos) captured from the environment of user 100. In addition, memory 550 may store information specific to user 100, such as image representations of known individuals, favorite products, personal items, etc. In some embodiments, when apparatus 110 is powered by mobile power source 520, memory 550 may be accessed by processor 540a. Further, when apparatus 110 is connected to station 210, memory 550 may be accessed by processor 540b. In one embodiment, processor 540a may determine, for example, which type of image data to store based on available storage space in memory 550. In another embodiment, processor 540b may extract information from the image data stored in memory 550.

As further shown in FIG. 5A, apparatus 110 includes mobile power source 520. The term "mobile power source" includes any device capable of providing electrical power, which can be easily carried by hand (e.g., mobile power source 520 may weigh less than a pound). The mobility of the power source enables user 100 to use apparatus 110 in a variety of situations. In some embodiments, mobile power source 520 may include one or more batteries (e.g., nickel-cadmium batteries, nickel-metal hydride batteries, and lithium-ion batteries) or any other type of electrical power supply. In other embodiments, mobile power source 520 may be rechargeable and contained within a casing that holds apparatus 110. In yet other embodiments, mobile power source 520 may include one or more energy harvesting devices for converting ambient energy into electrical energy (e.g., portable solar power units, human vibration units, etc.).

Mobile power source 510 may power one or more wireless transceivers (e.g., wireless transceiver 530 in FIG. 5A). The term "wireless transceiver" refers to any device configured to exchange transmissions over an air interface by use of radio frequency, infrared frequency, magnetic field, or electric field. Wireless transceiver 530 may use any known standard to transmit and/or receive data (e.g., Wi-Fi, Bluetooth®, Bluetooth Smart, 802.15.4, or ZigBee). In some embodiments, wireless transceiver 530 may transmit data (e.g., raw image data, processed image data, extracted information) from apparatus 110 to computing device 120.

Figure 5B:
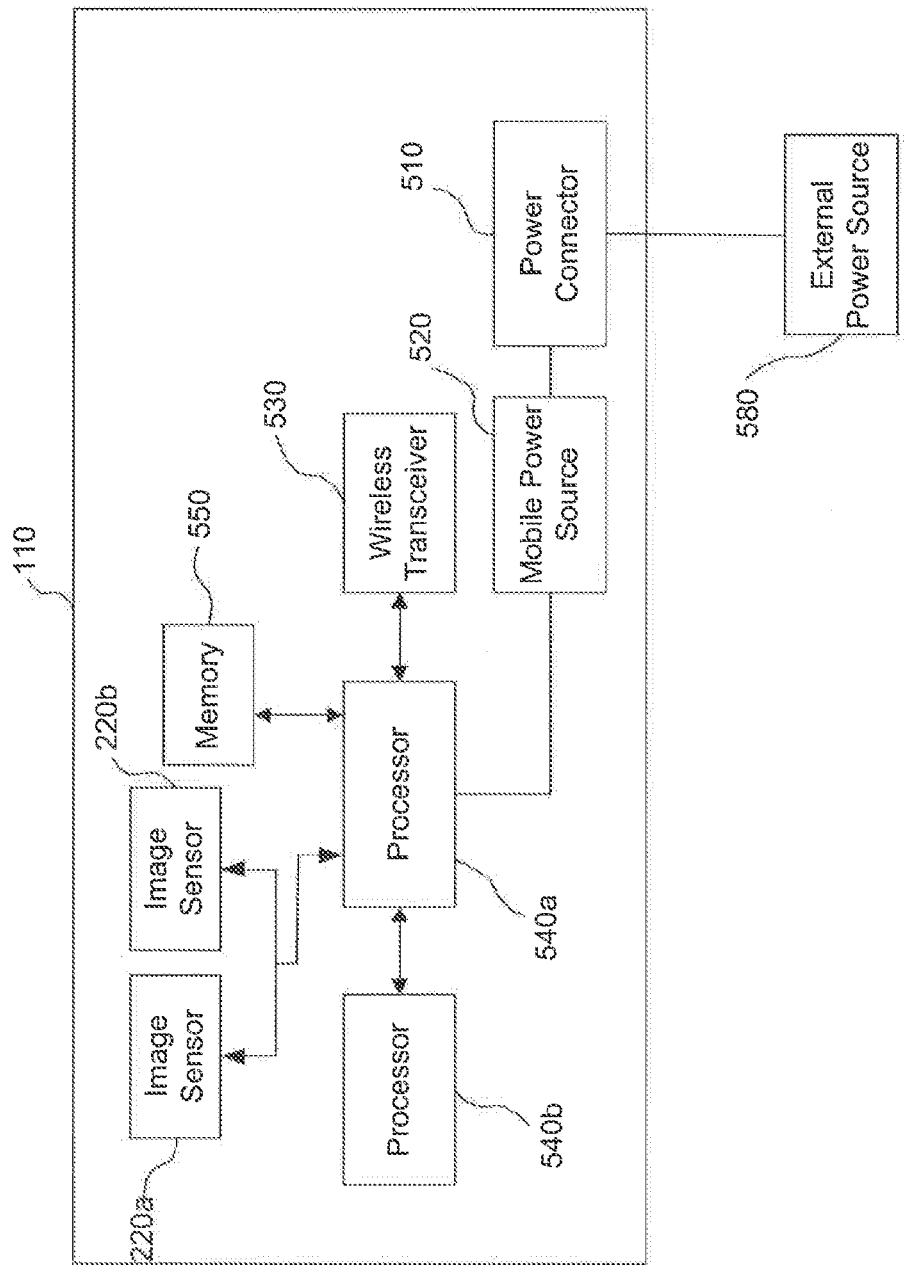
FIG. 5B is a block diagram illustrating an example of the components of a wearable apparatus according to a second embodiment.

FIG. 5B is a block diagram illustrating the components of apparatus 110 according to a second embodiment in which apparatus 110 communicates with server 250 via network 240. Specifically, FIG. 5B depicts an embodiment in which apparatus 110 communicates with server 250 in the second communication path, as discussed in connection with FIG. 2.

In this embodiment, apparatus 110 includes a first image sensor 220a, a second image sensor 220b, a memory 550, a first processor 540a, a second processor 540b, a wireless transceiver 530, a mobile power source 520, and a power connector 510. In the arrangement shown in FIG. 5B, each of the image sensors may provide images in a different image resolution, or face a different direction. Alternatively, each image sensor may be associated with a different camera (e.g., a wide angle camera, a narrow angle camera, an IR camera, etc.). In one embodiment, apparatus 110 can select which image sensor to use based on various factors. For example, processor 540a may determine, based on available storage space in memory 550, to capture subsequent images in a certain resolution.

Apparatus 110 may operate in a first processing-mode and in a second processing-mode, such that the first processing-mode may consume less power than the second processing-mode. For example, in the first processing-mode, apparatus 110 may capture images and process the captured images to make real-time decisions. In the second processing-mode, apparatus 110 may extract information from stored images in memory 550 and delete images from memory 550. In one embodiment, mobile power source 520 may provide more than fifteen hours of processing in the first processing-mode and about three hours of processing in the second processing-mode. Accordingly, different processing-modes may allow mobile power source 520 to produce sufficient power for powering apparatus 110 for various time periods (e.g., more than two hours, more than four hours, more than ten hours, etc.).

In some embodiments, apparatus 110 may use first processor 540a in the first processing-mode when powered by mobile power source 520, and second processor 540b in the second processing-mode when powered by external power source 580 that is connectable via power connector 510. In other embodiments, apparatus 110 may determine, based on predefined conditions, which processors or which processing modes to use. Apparatus 110 may operate in the second processing-mode, even when apparatus 110 is not powered by external power source 580. For example, apparatus 110, may determine that it should operate in the second processing-mode when apparatus 110 is not powered by external power source 580, if the available storage space in memory 550 for storing new image data is lower than a predefined threshold.

Although one wireless transceiver is depicted in FIG. 5B, apparatus 110 may include more than one wireless transceiver (e.g., two wireless transceivers). In an arrangement with more than one wireless transceiver, each of the wireless transceivers may use a different standard to transmit and/or receive data. In some embodiments, a first wireless transceiver may communicate with server 250 using a cellular standard (e.g., LTE or GSM), and a second wireless transceiver may communicate with computing device 120 using a short-range standard (e.g., Wi-Fi or Bluetooth®). In some embodiments, apparatus 110 may use the first wireless transceiver when the wearable apparatus is powered by a mobile power source included in the wearable apparatus, and use the second wireless transceiver when the wearable apparatus is powered by an external power source.

Figure 5C:
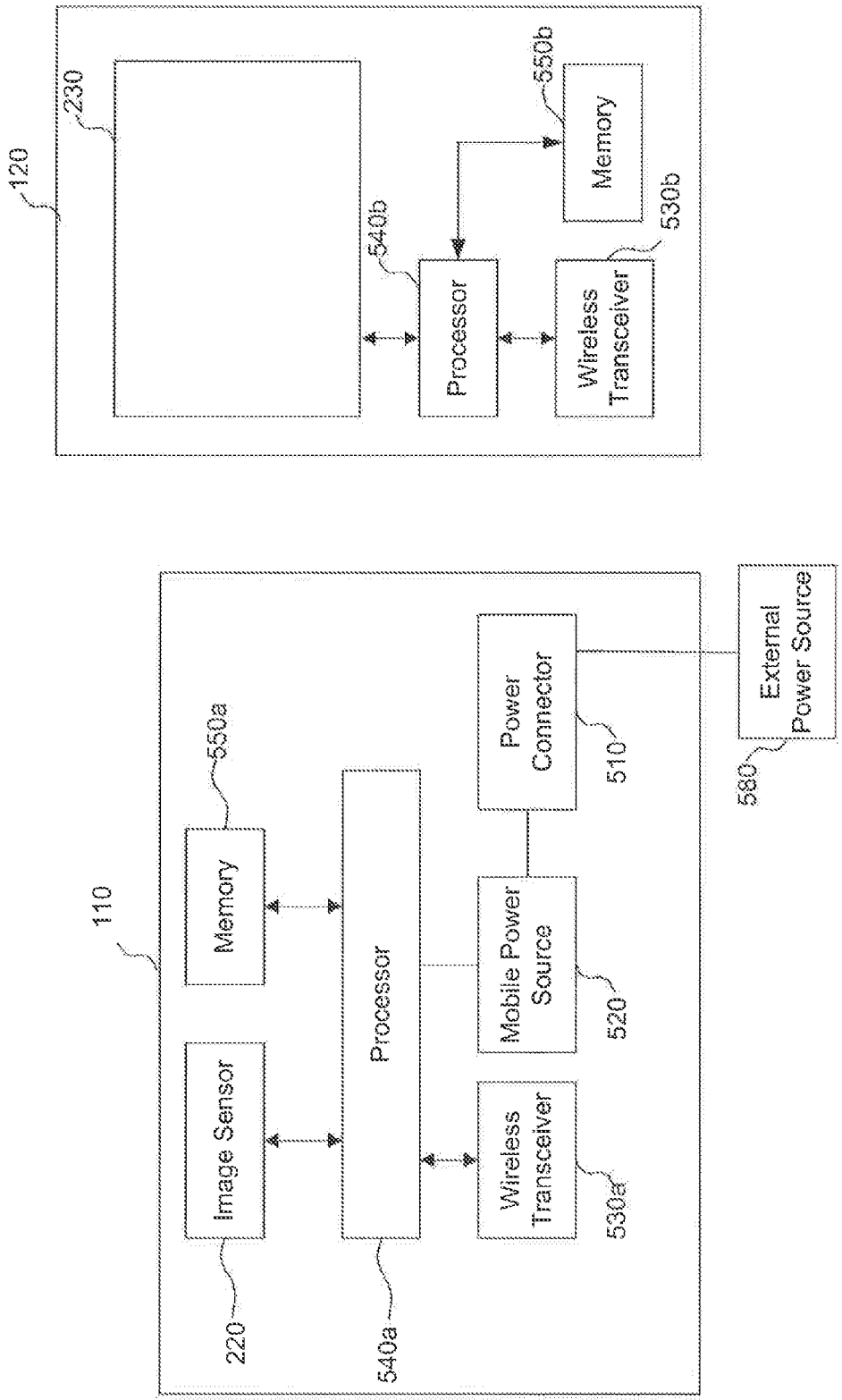
FIG. 5C is a block diagram illustrating an example of the components of a wearable apparatus according to a third embodiment.

FIG. 5C is a block diagram illustrating the components of apparatus 110 according to a third embodiment in which apparatus 110 communicates with server 250 via computing device 120. Specifically, FIG. 5B depicts an embodiment in which apparatus 110 communicates with server 250 in the third communication path, as discussed in connection with FIG. 2.

In this embodiment, apparatus 110 includes an image sensor 220, a memory 550a, a first processor 540a, a wireless transceiver 530a, a mobile power source 520, and a power connector 510. As further shown in FIG. 5O, computing device 120 includes a processor 540b, a memory 550b, a wireless transceiver 530a, and a display 230. One example of computing device 120 is a smartphone having a dedicated application installed therein. In this example, user 100 may view data (e.g., images, video clips, extracted information, etc.) on display 230. In addition, user 100 may select to store some of the data on server 250.

In some embodiments, processor 540a and processor 540b are configured to extract information from captured image data. The term "extracting information" includes any process by which information associated with objects, individuals, locations, events, etc., is identified in the captured image data by any means known to those of ordinary skill in the art. In one embodiment, apparatus 110 may use the extracted information to send real-time indications to computing device 120. For example, processor 540a may identify in the image data the individual standing in front user 100, and send computing device 120 the name of the individual and the last time user 100 met the individual. In a different embodiment processor 540b may extract statistical information from captured image data and forward the statistical information to server 250. For example, processor 540b may identify in the image data that user 100 goes once a week to McDonalds®. Based on this information, server 250 may send computing device 120 coupons and discounts associated with the user's preferences.

When apparatus 110 is wirelessly connected to computing device 120, apparatus 110 may transmit at least part of the image data stored in memory 550a for storage in memory 550b. In one embodiment after computing device 120 confirms that transferring the part of image data was successful, processor 540a may delete the part of the image data. The term "delete" means that the image is marked as 'deleted' and other image data may be stored instead of it, but does not necessarily mean that the image data was physically removed from the memory.

As will be appreciated by a person skilled in the art having the benefit of this disclosure, numerous variations and/or modifications may be made to the disclosed embodiments. Not all components are essential for the operation of apparatus 110. Any component may be located in any appropriate apparatus and the components may be rearranged into a variety of configurations while providing the functionality of the disclosed embodiments. Therefore, the foregoing configurations are examples and, regardless of the configurations discussed above, apparatus 110 can capture, store, and process images.

Further, the foregoing and following description refers to storing and/or processing images or image data. In the embodiments disclosed herein, the stored and/or processed images or image data may comprise a representation of one or more images captured by image sensor 220. As the term is used herein, a "representation" of an image (or image data) may include an entire image or a portion of an image, a representation of an image (or image data) may have the same resolution or a lower resolution as the image (or image data), and/or a representation of an image (or image data) may be altered in some respect (e.g., be compressed, have a lower resolution, have one or more colors that are altered, etc.).

For example, apparatus 110 may capture an image and store a representation of the image that is compressed as a .JPG file. As another example, apparatus 110 may capture an image in color, but store a black-and-white representation of the color image. As yet another example, apparatus 110 may capture an image and store a different representation of the image (e.g., a portion of the image). For example, apparatus 110 may store a portion of an image that includes a face of a person who appears in the image, but that does not substantially include the environment surrounding the person. Similarly, apparatus 110 may, for example, store a portion of an image that includes a product that appears in the image, but does not substantially include the environment surrounding the product. As yet another example, apparatus 110 may store a representation of an image at a reduced resolution (i.e., at a resolution that is of a lower value than that of the captured image). Storing representations of images may allow apparatus 110 to save storage space in memory 550. Furthermore, processing representations of images may allow apparatus 110 to improve processing efficiency and/or help to preserve battery life.

Early lifelogging apparatuses captured images on a predefined-time-interval basis, for example, a picture every few minutes. Those apparatuses tended to capture many low-quality images that did not have much utility. More recent lifelogging apparatuses are equipped with higher resolution cameras and built-in sensors (e.g., a light sensor) to improve the quality of the images being captured. Although these lifelogging apparatuses may capture images in a higher resolution and may avoid capturing low-quality images (e.g., by not capturing images when there is insufficient light), the lifelogging apparatuses still provide a significant quantity of images that depict monotonous moments (e.g., commuting to work, sitting in front of a computer). In addition, using higher resolution cameras require more storage space than lower resolution cameras and the lifelogging apparatuses can quickly run out of storage space.

One option to overcome the constraint of a limited built-in memory is using cloud storage, i.e., continuously uploading captured images to an Internet server. This option, however, is not very practical because continuously uploading image data consumes a large amount of power, which means the wearable apparatus may not be able to work efficiently for a long period of time. One embodiment of the present disclosure deals with the restricted storage constraint by dynamically adjusting the data size of the image data being stored.

In certain aspects, the data size of an image may be dependent on the parameters under which the image was captured. These parameters may be referred to herein as "capturing parameters." Capturing parameters may include any setting, criteria, or condition under which an image is captured by an image sensor, such as image sensor 220. Further, capturing parameters may include settings of other input devices, such as an audible input device and/or a device that identifies contextual information (e.g., time, date, location). In an exemplary embodiment, capturing parameters of image sensor 220 may be adjusted in order to impart control over the data size of images subsequently captured.

Further, since adjustment of capturing parameters to control the data size of captured images may affect the quality of an image, it may be advantageous for apparatus 110 to adjust capturing parameters based on particular factors. These factors may include the content and/or the importance of the content being captured, the intent of the user, context information, availability of storage space, power level of a power source, and/or any other information that may indicate a particular value of a capturing parameter for capturing an image. In addition, it should be understood that capturing parameters may be adjusted based on these factors for reasons other than to control the data size of a subsequently captured image.

Figure 6:
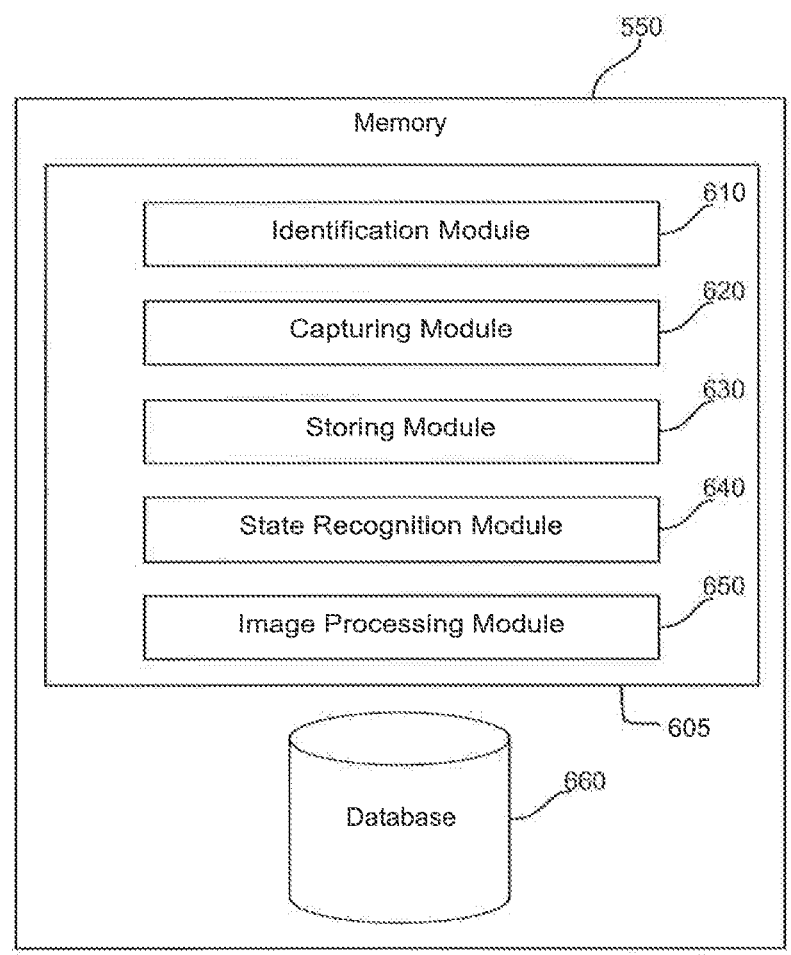
FIG. 6 is a block diagram illustrating an example of a memory configured to control capturing and processing of images, consistent with disclosed embodiments.

Apparatus 110 (and/or station 210) may include components (e.g., processors 540a, 540b, memory 550) configured to perform one or more processes to control the capture and storage of images and/or representations of images such that apparatus 110 may efficiently use available resources while maintaining expansive functionality. As shown in FIG. 6, memory 550 may include a plurality of modules 605, which may include an identification module 610, a capturing module 620, a storing module 630, a state recognition module 640, and an image processing module 650. In at least some embodiments, memory 550 may also include a database 660.

In an exemplary embodiment, identification module 610 may be a component configured to identify an input that may affect the manner in which apparatus 110 captures and/or stores an image and/or a representation of an image. Capturing module 620 may be a component configured to manage the capture of images (e.g., by image sensor 220) through control of one or more capturing parameters. Storing module 630 may be a component configured to manage the storage of captured images and/or representations of captured images in a storage device (e.g., memory 550). State recognition module 640 may be a component configured to determine a current state of apparatus 110 (e.g., the communication paths, processors, image sensors, storage device, etc. that are available). For example, state recognition module 640 may be configured to determine whether apparatus 110 is in-use (e.g., in which apparatus 110 is being worn and used by a user) or not in-use (e.g., in which apparatus 110 is not being used and may be connected to a managing device, such as station 210 to charge mobile power source 520. Image processing module 650 may be a component configured to perform processing of image data to extract information from the corresponding images and/or representations of images. Database 660 may be a component configured to store data associated with the capture and storage of images and/or representations of images, and provide particular data when requested.

Modules 605 may be implemented in software, hardware, firmware, a mix of any of those, or the like. For example, if modules 605 are implemented in software, they may be stored in a memory. While memory 550 is shown in FIG. 6, it should be understood that one or more of modules 605 may be stored in any memory, including memory 550a and memory 550b depicted in FIG. 5C. Other components of apparatus 110, computing device 120, station 210, and/or server 250 may be configured to perform processes to implement and facilitate operations of modules 605. Thus, modules 605 may include software, hardware, or firmware instructions (or a combination thereof) executable by one or more processors (e.g., processor 540a and/or processor 540b), alone or in various combinations with each other. For example, modules 605 may be configured to interact with each other and/or other modules of apparatus 110, computing device 120, or any other connected component to perform functions consistent with disclosed embodiments. For example, in some embodiments, modules 605 may each include dedicated sensors (e.g., IR, image sensors, etc.), communication devices, and/or dedicated application processing devices configured to perform the disclosed functionality.

Database 660 may include one or more memory devices that store information and are accessed and/or managed through a computing device, such as processor 540*a*, 540*b*, computing device 120, station 210 and/or server 250. In some embodiments, database 660 may be located in memory 550, as shown in FIG. 6. In other embodiments, database 660 may be located remotely from memory 550 (e.g. computing device 120, station 210, server 250), and be accessible to other components of apparatus 110 (e.g., processor 540*a*) via one or more wireless connections (e.g., network 240). While one database 660 is shown, it should be understood that several separate and/or interconnected databases may make up database 660. Database 660 may include computing components (e.g., database management system, database server, etc.) configured to receive and process requests for data stored in memory devices associated with database 660 and to provide data from database 660.

In some embodiments, database 660 may be configured to store data associated with controlling the capture and storage of images. For example, database 660 may include recognized objects. In some embodiments, recognized objects may include images of objects that were previously stored via apparatus 110. Recognized objects may be objects that apparatus 110 is configured to identify in image data received by image sensor 220. Recognized objects may include any physical object, a person, an area, an environment, a background, and any combination and/or grouping of these. Recognized objects may include a particular aspect of an object (e.g., shape, color, text, logo, etc.).

In some embodiments, recognized objects may include visual triggers, including triggers associated with controlling the capture and storage of images. In some embodiments, visual triggers may include any stored image or representations of an image that apparatus 110 may recognize as an input indicating a particular intention of the user of apparatus 110. For example, an individual, an individual's moving lips, text, a pointing finger, a specific object, a particular hand motion, change in the field-of-view of apparatus 110, change in the user's area of focus, and the like, may be visual triggers. In some embodiments, apparatus 110 may be configured to perform a process to match a visual trigger in image data to a visual trigger stored in database 660 and perform additional processing to determine a particular action associated with the trigger (e.g., control of a capturing parameter).

In an exemplary embodiment, modules 605 may be configured to communicate with each other and with database 660. For example, identification module 610 may monitor captured images for visual triggers and communicate with database 660 to match the visual trigger with one or more visual triggers stored in database 660. If a matching visual trigger is detected, identification module 610 may inform capturing module 620. Capturing module 620 may use the information to determine a value of a capturing parameter that may be controlled based on the trigger, and communicate with components of apparatus 110 to cause apparatus 110 to adjust the capturing parameter accordingly. Storing module 630 may subsequently receive image data associated with captured images and arrange for the image data to be stored (e.g., in memory 550). Identification module 610 may continue to monitor image data to determine if any additional visual triggers affecting capturing and/or storage are found.

In some embodiments, a particular mode of apparatus 110 may affect the capture and storage of images. For example, whether apparatus 110 is connected to server 250 through the first, second, and/or third communication path may affect aspects such as capturing parameters, available storage space, battery life, etc., which may affect the manner in which apparatus 110 captures and/or stores images. In some embodiments, state recognition module 640 may be configured to identify the particular communication path such that capturing and storing processes may be controlled accordingly. As will be described in more detail, state recognition module 640 may also recognize a particular ode of apparatus 110 (e.g., in-use, not in-use, online, offline, etc.) and determine appropriate image processing for one or more other modules 605 (e.g., image processing module 650) to perform on captured images.

Figure 7:
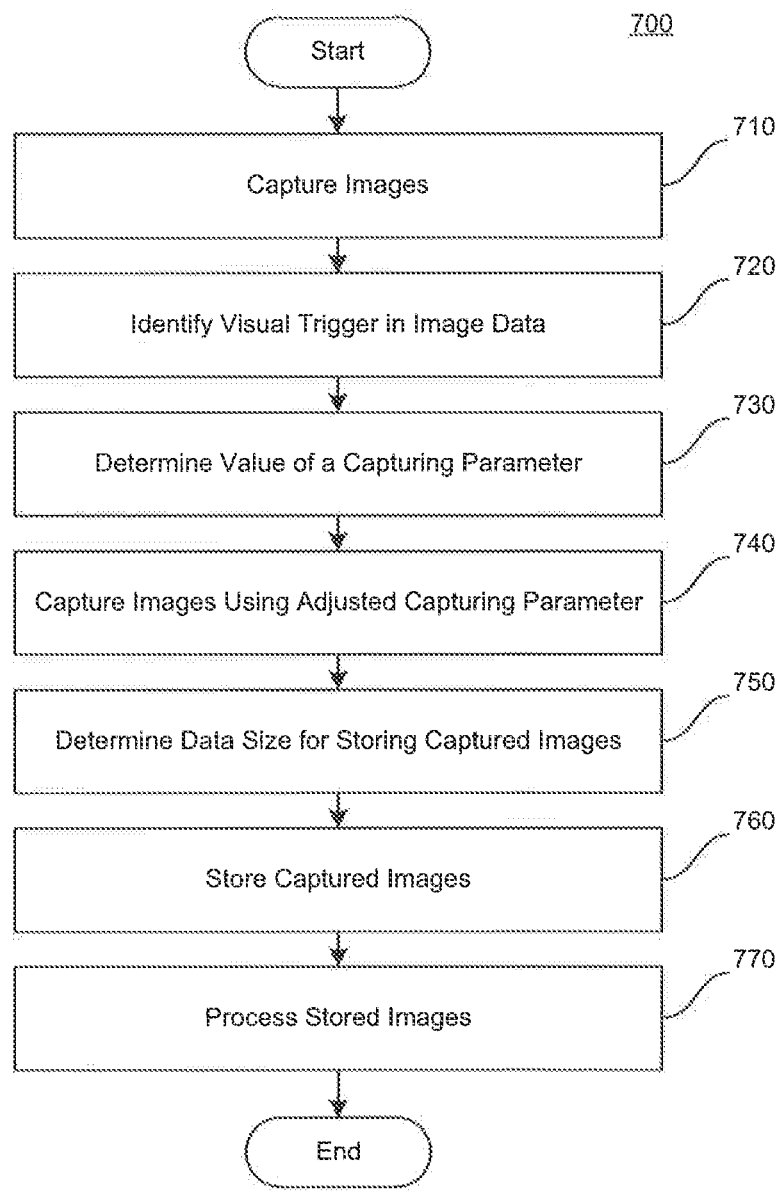
FIG. 7 is a flowchart of an example of a process for capturing and processing images, consistent with disclosed embodiments.

FIG. 7 depicts an example of a process 700, consistent with disclosed embodiments. In some embodiments, one or more components of apparatus 110 may perform process 700 to control the capture and storage of images. For example, in some aspects, process 700 may allow apparatus 110 to dynamically control capturing parameters to balance the criteria for a particular image (e.g., what aspects of the image are necessary to allow the image to be used in a particular functionality of apparatus 110) with the ability to store the image (e.g., whether the amount of storage space required to store the image is justified). In an exemplary embodiment, one or more of modules 605 may be configured to perform at least part of process 700.

In performing process 700, apparatus 110 may be configured to capture images using image sensor 220 (which may include image sensor 220*a* and/or 220*b*). Image sensor 220 may be configured to capture a plurality of images of anything in the field-of-view of image sensor 220, which may include at least a portion of the environment of the user (e.g., what the user may see). In doing so, apparatus 110 and image sensor 220 may be arranged with various capturing parameters that affect the process of capturing images and the corresponding image data. Examples of capturing parameters may include: image resolution, a compression ratio, a scaling parameter, a cropping parameter, frame rate, a focus point, an exposure time, an aperture size, and a light sensitivity. In some embodiments, capturing parameters may also include parameters associated with audible input, location determination, time/date determination, such as activation of a microphone, GPS device, etc. Apparatus 110 may include components configured to control capturing parameters such that each capturing parameter is set to a specified value (e.g., an image resolution of 3 megapixels). Apparatus 110 may be configured to adjust the specified value of one or more capturing parameters, which may take place during performance of process 700.

Image sensor 220 (which may include image sensor 220*a* and/or 220*b*) may capture at least one image with one or more capturing parameters set to a specified value (step 710). As has been described, the image or plurality of images may capture a portion of an environment of a user as image data (e.g., images, videos, etc.). Image sensor 220 may capture the image data, which may be transmitted to other components of apparatus 110 for further processing, such as processing via identification module 610.

In some embodiments, identification module 610 may process received image data to determine whether one or more images include a visual trigger. If the captured environment includes a visual trigger, identification module 610 may identify the visual trigger in the image data (step 720). Identification module 610 may be configured to identify various types of visual triggers. For example, identification module 610 may be configured to identify: an individual-type trigger (e.g., a person found in the image), an object-type trigger (e.g., a particular object found in the image, such as a menu or newspaper), an activity-type trigger (e.g., a particular activity or action found in a sequence of images, such as the user's hand pointing at an individual), a location-type trigger (e.g., a particular location or type of location recognized from the image, such as a store, a park, indoors, outside, etc.), a logo-type trigger (e.g., a particular logo found in the image), a text-type trigger (e.g., text found in the image), a document-type trigger (e.g., a document found in the image), a lip-moving trigger (e.g., a recognition that an individual in the image spoke or is speaking), or any other type of trigger that may exist in an image or images and is recognizable by identification module 610.

In some embodiments, identification module 610 may be configured to communicate with database 660 to determine whether an aspect of a captured image or sequence of images matches a visual trigger stored in database 660. In particular, identification module 610 may be configured to identify a visual trigger by comparing a representation of the visual trigger with a plurality of representations of visual triggers stored in database 660 (or another storage component) to find a match. Based on the match, identification module 610 may determine a type and/or an identity of the visual trigger. For example, a person in an image may be determined to be an individual-type trigger with an identity of a specific person, such as a friend or family member with a representation stored in database 660.

In addition, apparatus 110 and identification module 610 may be configured to identify triggers that are not necessarily visual (e.g., triggers that are not found in the image data). For example, identification module 610 may be configured to identify a trigger based on other information, such as a location of apparatus 110 (e.g., a global position system (GPS) trigger), time of day, date, day of the week, etc. (e.g., time-of-day trigger), an audible sound (e.g., an audible trigger), and the like. Apparatus 110 may include components configured to communicate with identification module 610 such that these triggers may be identified. For example, apparatus 110 may include a sound input device (e.g., microphone), an internal clock device, and/or a GPS device.

In an exemplary embodiment, apparatus 110 may, based on information about an identified visual trigger (or multiple visual triggers), such as the type and/or identity of the visual trigger or triggers, determine a value for at least one capturing parameter (step 730). For example, identification module 610 may transmit a notification to capturing module 620, including the type and/or identity of the visual trigger identified. Capturing module 620 may process the information to determine whether a capturing parameter should be adjusted for capturing of subsequent images (i.e., whether to set a capturing parameter to a particular value).

In one example, identification module 610 may identify a person in a captured image, which may be an individual-type visual trigger. Capturing module 620 may receive information indicating that this type of visual trigger was found and determine that an image resolution should be adjusted. For example, image resolution may be increased such as to improve accuracy of a process of matching the individual in the image data to recognized individuals (e.g., a friend or family member with information stored in database 660). In another example, identification module 610 may determine that an individual's lips are moving (e.g., a lip-moving type trigger) and adjust a focus point and cropping parameter to isolate the individual's moving lips.

Based on this information (e.g., an individual-type visual trigger being identified), capturing module 620 may determine a value of the capturing parameter, which in this case may be an image resolution to use for subsequent images. In another example, the identity of the individual may itself be a visual trigger. For example, identification of a family member may be a visual trigger wherein the identity of the visual trigger (e.g., the family member) indicates a value of a capturing parameter (e.g., higher frame rate to capture higher quality video of the family member).

In at least some embodiments, capturing module 620 may also be configured to adjust capturing parameters by selecting a capturing mode based on identification of a visual trigger. For example, capturing module 620 may be configured to select a capturing mode from a plurality of available capturing modes based on a type of an identified visual trigger. The capturing mode may affect various capturing parameters, such as frame rate, focus point, light settings, color settings, aperture size, among others. Examples of capturing modes may include a stop motion capturing mode, a video capturing mode, an audio capturing mode, a 3D capturing mode, an optical character recognition (OCR) mode, etc. In this way, capturing module 620 may be configured to associate an identified visual trigger type and/or identity with a particular capturing mode, which may include values for several capturing parameters. For example, identification module 610 may identify a text-type trigger, which may cause capturing module 620 to use an OCR mode in capturing subsequent images.

In some embodiments, capturing module 620 may be configured to adjust capturing parameters based on other factors (e.g., in addition to or instead of visual triggers). For example, capturing module 620 may be configured to determine a value for a capturing parameter (and/or a capturing mode) based on available storage space in a storage device (e.g., memory 550). In this way, capturing module 620 may account for the amount of storage space available when determining capturing parameters of subsequent images (which may affect data size of the images), which may allow for more efficient use of resources (e.g., storage space).

In another example, capturing module 620 may be configured to adjust capturing parameters based on other triggers, such as a GPS trigger, a time-of-day trigger, an audible trigger, and the like. For example, identification module 610 may identify a GPS trigger that indicates that the user is travelling. Capturing module 620 may receive this information and adjust a value of a capturing parameter and/or a capturing mode accordingly (e.g., lower frame rate and resolution). In this way, capturing module 620 may be configured to account for contextual factors that may not be identifiable in the image data as a visual trigger.

It should be understood that adjustment of capturing parameters may also include adjustment of other input devices. For example, a GPS device may be activated to determine a location of apparatus 110, a microphone may be activated to start recording audible input, the time of day may be marked, etc. These may allow for increased functionality for apparatus 110, such that associated with dynamic control of capturing information that may not be include in image data.

It should also be understood that capturing module 620 may be configured to adjust values of capturing parameters and/or capturing modes based on one or more of the triggers discussed above (visual and non-visual), and any combination thereof. For example, capturing module 620 may be configured to determine a value of a capturing parameter based on a type of at least one identified trigger and available storage space in a storage device (e.g., memory 550). Similarly, capturing module 620 may be configured to select a particular capturing mode only when a particular visual trigger (e.g., individual-type trigger) and a particular non-visual trigger (e.g., audible trigger) are identified. In another example, capturing module 620 may be configured to determine a value of at least one capturing parameter based on an identified visual trigger and a value of at least one other capturing parameter based on a non-visual trigger. The effects of the various triggers may be determined in a manner that allows apparatus 110 to achieve a particular goal and/or functionality (e.g., efficient use of storage space).

It should also be understood that apparatus 110 may adjust a value of a capturing parameter in a manner specific to the capturing parameter. For example, some capturing parameters (e.g., compression ratio, frame rate, exposure time) may be adjusted electronically. Other capturing parameters (e.g., focus point, aperture size) may be adjusted through physical movement of a component of apparatus 110 (e.g., changing the angle or position of image sensor 220). Still other capturing parameters may be adjusted by switching between multiple components.

For example, apparatus 110 may include two image sensors 220, such as image sensor 220a and 220b depicted in FIG. 5B. Image sensor 220a may be configured to capture images at a first resolution and image sensor 220b may be configured to capture images at a second resolution, which may be higher than the first resolution. Capturing module 620 may be configured to cause apparatus 110 to switch between use of image sensor 220a and 220b to adjust the resolution of captured images, depending on the effect of an identified trigger.

After capturing module 620 adjusts capturing parameters based on one or more identified triggers, image sensor 220 may capture at least one subsequent image with the capturing parameter set to the determined value and/or using the determined capturing mode (step 740). The image data associated with these images may be processed (e.g., to look for additional visual triggers) and sent to storing module 630. In process 700, storing module 630 may be configured to determine a data size for storing captured images (step 750), which may include images captured in step 710 and images subsequently-captured in step 740.

Storing module 630 may determine the data size based on information about the captured image or information about a representation of the captured image. For example, storing module 630 may be configured determine a data size for storing one or more subsequently-captured images based on an identified trigger (e.g., the type of an identified visual trigger). In another example, storing module 630 may be configured to determine a data size for storing one or more subsequently-captured images based on a power level of a power source (e.g., mobile power source 520).

Storing module 630 may be further configured to store captured images and/or representations of captured images (e.g., captured in step 710 and/or step 740) in a storage device (e.g., memory 550 included with apparatus 110) (step 760). In some embodiments, storing module 630 may determine a storage location from a plurality of options (e.g., memory 550a, memory 550b, database 660, server 250), which may depend on the determined data size and other factors, such as available storage space in one or more of the storage devices.

Further, in some embodiments, storing module 630 may be configured to select a subset of subsequently-captured images and/or representations of subsequently-captured images for storage. Storing module 630 may select the subset based on a predefined rule. For example, storing module 630 may be configured to store some captured images and skip others (e.g., store every-other image) and/or store images that meet particular criteria (e.g., sufficient light exposure, presence of a visual trigger, etc.). In this way, storing module 630 may provide efficient storage techniques.

In some embodiments, image processing module 650 (or one or more other components of apparatus 110, station 210, computing device 120, and/or server 250) may process stored images and/or stored representations of images (step 770). For example, image processing module 650 may be configured to extract information from stored images and/or stored representations of images, a process which will be described in more detail below. Image processing module 650 may also be configured to delete stored images and/or stored representations of images, such as after information has been extracted. In this way, storage space may be made available for storage of different images.

Apparatus 110 may be configured to perform process 700 to dynamically adjust capturing parameters based on various factors and subsequently store captured images that achieve particular goals and/or functionality. In one example, apparatus 110 may identify a gesture in captured image data and adjust image capturing parameters (e.g., cropping parameters, frame rate, image resolution, etc.) to allow for more accurate identification of the gesture (e.g., by detecting and tracking the user's hands). Similarly, apparatus 110 may determine that a user is eating a meal (e.g., through an object-type trigger) and adjust capturing parameters to allow for more accurate identification of the meal content and/or the individuals that are present at the meal. In another example, apparatus 110 may determine that the user is taking part in a sport activity (e.g., by detecting motion patters, particular objects such as a ball, etc.) and adjust the capturing parameters to improve capturing of the activity (e.g., increasing frame rate, storing particular images, analyzing the activity, etc.).

In a particular example, apparatus 110 includes at least one image sensor (e.g., image sensor 220, image sensor 220a and 220b) configured to capture images in different resolutions (a first resolution and a second resolution higher than the first resolution). Apparatus 110 may be configured to perform process 700 to switch between capturing an image with the first resolution and capturing an image with the second resolution, depending on identified information, such as one or more triggers (e.g., visual triggers) found in captured image data.

In one example, identification module 610 may be configured to identify an existence of at least one visual trigger in at least one image captured using the first resolution. For example, identification module 610 may identify a person in a captured image as an individual-type visual trigger. Based on the identified trigger or triggers (e.g., the type and/or identity of a visual trigger identified by comparing a representation of the visual trigger with a plurality of stored representations to find a match), capturing module 620 may determine that at least one subsequent image should be captured using the second resolution. Accordingly, capturing module 620 may instruct the at least one image sensor to capture a plurality of subsequent images in the second resolution.

In this way, a higher resolution image of the person may be captured, which may allow for more accurate matching of the person's features to features stored by apparatus 110 or other components (e.g., database 660). Storing module 630 may store the subsequently captured images in a storage device (e.g., memory 550). In some instances, storing module 630 may select a subset of the subsequently-captured images for storage, which may be based on a predefined rule.

In addition, identification module 610 may process stored images and/or stored representations of images to look for additional triggers and/or determine if other factors indicate a non-visual trigger. For example, identification module 610 may determine that the available storage space indicates that the resolution should be re-adjusted. Capturing module 620 may receive a notification of the available storage space and cause apparatus 110 to switch back to capturing images in the first resolution. In this way, if storage space becomes low, data size can be reduced by reducing image resolution.

As has been described, storing module 630 may be configured to determine a data size of captured images prior to storage. For example, storing module 630 may determine a data size for storing at least one subsequently captured image (e.g., an image captured in the second resolution) based on the visual trigger (e.g., the type and/or identity of the visual trigger) and/or a power level of a power source (e.g., mobile power source 520). In some embodiments, image processing module 650 may subsequently process stored images and/or stored representations of images, such as to extract information and/or delete one or ore stored images and/or stored representations of images from the storage device (e.g. memory 550).

As described above, captured images may be processed such that storage space is efficiently used. In certain aspects, the processing of captured images itself may depend on other factors, such as a mode determined by state recognition module 640 (e.g., in-use, not in-use). Selective processing modes may help overcome another constraint that current lifelogging apparatuses have: a limited power supply.

One way to prolong battery life is to avoid processing images in real-time. This option, however, means that the wearable apparatus would capture many low utility images and/or routine images. According to one embodiment, apparatus 110 can avoid at least some of the real-time processing of images when a state of low battery charge is detected by apparatus 110. According to another embodiment, apparatus 110 may defer some of the processing of the images while apparatus 110 is not connected to an external power source.

As used herein, real-time image processing may refer to processing images and/or representations of images in real-time or near real-time. For example, identification module 610 may monitor the field-of-view of apparatus 110 to detect inputs while capturing module 620 may determine whether to adjust a capturing parameter. Accordingly, identification module 610 and capturing module 620 may operate in parallel. For example, apparatus 110 may capture and analyze image data in parallel, or may institute a queue-like implementation whereby image data is captured and then analyzed in a continuous fashion (i.e., a first image is captured and analyzed while a subsequent image is captured and then subsequently analyzed).

In order to achieve these and other functionalities, apparatus 110, computing device 120, station 210, and server 250 may include components configured to perform one or more processes to determine which of a plurality of processing modes to use. For example, apparatus 110 (e.g., memory 550) may include state recognition module 640 and image processing module 650.

Figure 8:
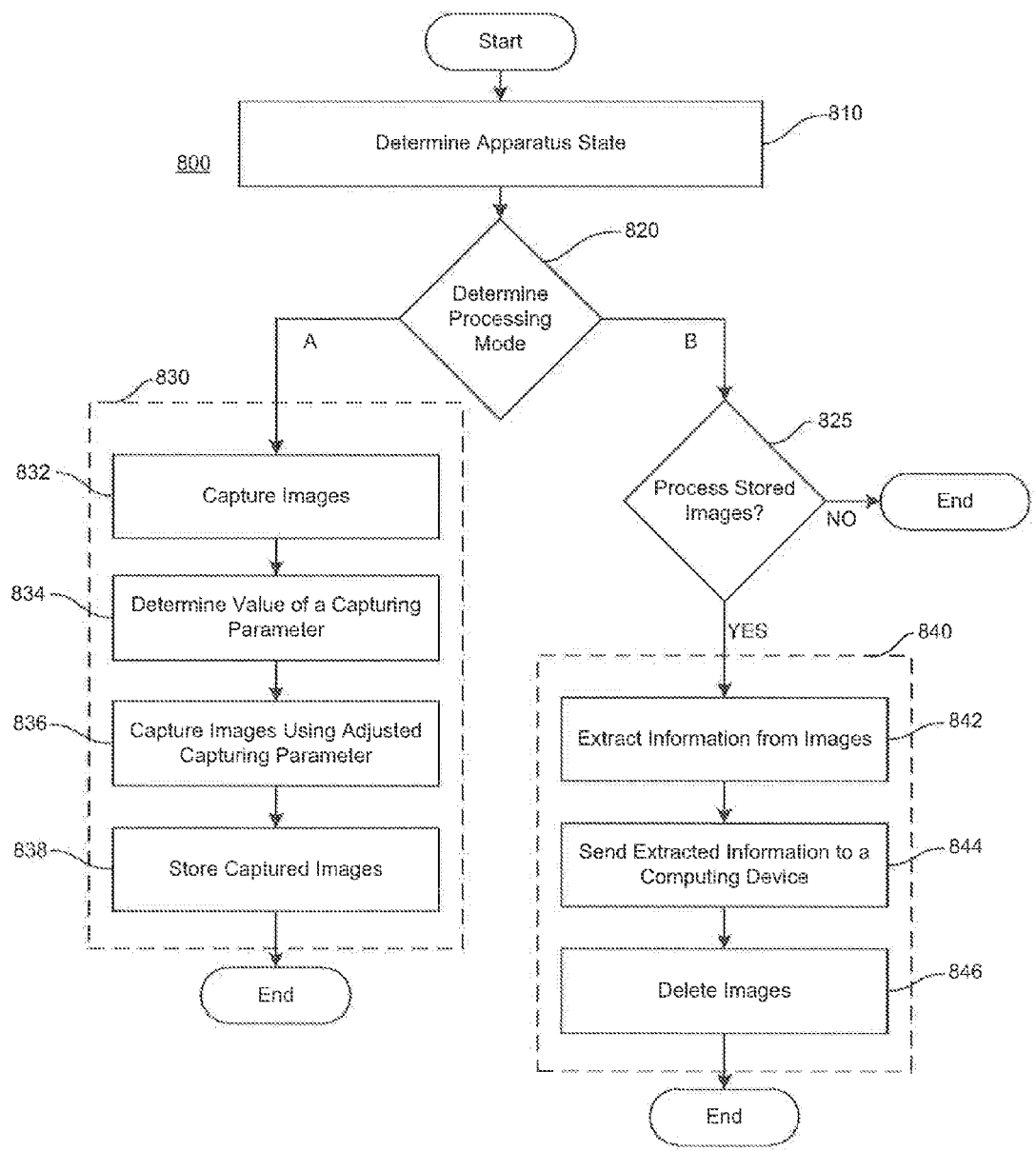
FIG. 8 is a flowchart of an example of a process for selectively processing images, consistent with disclosed embodiments.

FIG. 8 illustrates an example process 800, consistent with disclosed embodiments. In certain embodiments, components of apparatus 110, computing device 120, station 210, and/or server 250 may perform at least part of process 800 to selectively process images and/or representations of images in a manner that prolongs battery life. In certain aspects, process 800 may allow processing to be divided between one or more processors associated with apparatus 110, computing device 120, station 210, and server 250 such that mobile power source 520 may be used in processing as needed to achieve goals and functionalities of apparatus 110. Apparatus 110 and/or other components may perform other processing when an additional power source, such as external power source 580, is available. For example, during the course of the day, when apparatus 110 is worn by a user, managing processing activities of apparatus 110 may help to prolong battery. At other times, such as, for example, in the evening when apparatus 110 is being charged, power saving is not a concern, and apparatus 110 may therefore undergo more power-intensive processing activities.

In process 800, apparatus 110 may determine a state of apparatus 110 (step 810). In one embodiment, state recognition module 640 may determine whether apparatus 110 is in a first state or a second state. The first state may be an in-use state in which apparatus 110 is worn by a user and may be capturing images and/or other input from an environment of the user. The second state may be a not in-use state in which apparatus 110 is not being worn by the user and may be performing operations, such as processing stored images and/ or stored representations of images, and/or charging mobile power source 520. In some embodiments, apparatus 110 may be connected to station 210 when in the second state.

State recognition module 640 may determine the current state of apparatus 110 from the state of one or more components of apparatus 110. For example, state recognition module 640 may determine that apparatus 110 is connected to station 210, such as through recognition of a connection between data ports 570a, 570b and/or power connections 510a, 510b, and therefore is in the second state. In another example, state recognition module 640 may determine that apparatus 110 is in the second state through input from a component indicating that apparatus 110 has not moved in a predetermined a period. In another example, state recognition module 640 may determine a state of apparatus 110 through a determination of a position of function button 430. In this way, a user may indicate an intent to use or not use apparatus 110 through movement of function button 430. In embodiments that include more than one processor 540, state recognition module 640 may also determine which processor (e.g., processor 540a and/or processor 540b) is available.

In one embodiment, after state recognition module 640 determines a state of apparatus 110, apparatus 110 (via, e.g., image processing module 650) may select a processing mode for performing one or more subsequent processes while apparatus 110 is in the determined first state. For example, image processing module 650 may determine whether apparatus 110 should use a first processing-mode 830 or a second processing-mode 840. In some embodiments, image processing module 650 may determine which processing mode should be used based on the state of apparatus 110 determine in step 810. For example, image processing module 650 may determine that first processing-mode 830 should be used when apparatus 110 is in the first state (e.g., being used to capture images) and that second processing-mode 840 should be used when apparatus 110 is in the second state (e.g., not in-use and/or connected to station 210).

If image processing module 650 determines that apparatus 110 should use first processing-mode 830 (step 820—A), apparatus 110 may operate to perform one or more in-use operations. In one embodiment, apparatus 110 may operate to capture images from an environment of the user (step 832). For example, a user may wear apparatus 110 while apparatus 110 captures images from a field-of-view of image sensor 220. As has been described, apparatus 110 may capture an image according to one or more capturing parameters, which may include image resolution, a scaling parameter, a cropping parameter, a compression ratio, a frame rate, a focus point, an exposure time, an aperture size, light sensitivity, etc.

In some embodiments, first processing-mode 830 may be a processing mode in which captured images are processed in a manner similar to that of process 700. For example, first processing-mode 830 may include processing the plurality of captured images to determine a value of at least one capturing parameter for use in capturing at least one subsequent image (step 834). As described with respect to process 700, processing an image to determine a value of one or more capturing parameters may allow for efficient use available storage space.

Identification module 610 and/or capturing module 620 may determine a value of one or more capturing parameters based on available information, much like that described in process 700. For example, capturing module 620 may determine a value of a capturing parameter based on identification module 610 identifying at least one visual trigger in the plurality of captured images. Examples of visual triggers may include: an individual, an object, an activity, a location, a logo, text, a document, and the like. In another example, capturing module 620 may determine a value of a capturing parameter based on identification module 610 identifying at least one event (which may be a type of visual trigger) in the plurality of captured images. Examples of events include: meeting with an individual, visiting a known location, entering a vehicle, leaving a vehicle, interacting with an object, participating in a sport activity, eating a meal, and the like.

Capturing module 620 may adjust capturing parameters according to a particular trigger, event, or other information identified by identification module 610. For example, capturing module 620 may adjust a focus point to focus on an individual's face, increase image resolution to identify a logo, increase a frame rate to identify an activity, reduce various capturing parameters when a vehicle is entered, etc. In another example, capturing parameters may be adjusted when an object (e.g., a product with a logo) is identified, such that additional information about the object is collected, such as where and when the object was seen and/or other contextual information. In some embodiments, in first processing-mode 830, capturing module 620 may capture subsequent images using the determined capturing parameter (step 836).

Storing module 630 may store the captured images and/or representations of the captured images (e.g., captured in steps 810 and/or 834) in a storage device (step 838). For example, storing module 630 may store captured images and/or representations of the captured images in memory 550 (including memory 550a and/or 550b), server 250, or another storage device connected to apparatus 110. In some embodiments, the stored image data may undergo further processing, such as that associated with second processing-mode 840. For example, the stored image data may undergo processing at a later time, such as when apparatus 110 is connected to station 210. Accordingly, image processing may occur at a time in which saving power is not a concern.

As shown in FIG. 8, if image processing module 650 determines that second processing-mode 840 should be used (e.g., apparatus 110 is the second state) (step 820—B), image processing module 650 may also determine whether there are stored images and/or stored representations of images to process (step 825). In one embodiment, stored images and/or stored representations of images may include any images and/or representations of images captured by apparatus 110 and stored in a storage device (e.g., memory 550). In some embodiments, stored images and/or stored representations of images may be captured during first processing-mode 830, although it should be understood that image data may be captured through other processes and/or processing modes. If image processing module 650 determines that there are not any stored images and/or stored representations of images to process (e.g., apparatus 110 is only connected to station 210 to charge mobile power source 580) (step 825—NO), process 800 may end. However, if image processing module 650 determines that there are stored images and/or stored representations of images to process (step 825—YES), image processing module 650 may be configured to process the associated image data using second processing-mode 840.

In one embodiment, second processing-mode 840 may include processing a plurality of stored images and/or stored representations of images to extract information (step 842). For example, image processing module 650 may search the plurality of stored images and/or stored representations of images for information contained in the image data. In certain aspects, the information may include information about the people, places, and things that were present in the user's environment while the images were captured. This information may be useful to the user and other entities, such as merchants and/or financial service providers.

In one example, the information extracted in the second processing-mode may include information identifying one or ore occurrences of a product in the environment of the user. Similarly, the extracted information may include information identifying one or more occurrences of a logo in the environment of the user, information associated with the user's exposure to product families, and/or the user's product-usage habits.

Image processing module 650 may be configured to determine these occurrences by searching the images and/or representations of images for a predefined object. For example, processing module may store a representation of a product and/or a logo in database 660, and image processing module 650 may match a representation of a logo found in the image data to the stored data to find a match and determine that an object or logo is present in the image data. In another example, image processing module 650 may identify products by identifying a user's hand holding an object.

In some embodiments, image processing module 650 may send the extracted information to a computing device (step 844). For example, image processing module 650 may send extracted information to computing device 250, which may be a smartphone. Image processing module 650 may send extracted information to computing device 250 using wireless transceiver 530 (e.g., wireless transceiver 530a), which may be a transmitter. Computing device 250 may receive the extracted information through wireless transceiver 530b. In another example, image processing module 650 may send extracted information to server 250, which may be an Internet server. Image processing module 650 may send extracted information to server 250 through network 240, which may be an Internet connection, using any of the communication paths depicted in FIG. 2.

Image processing module 650 may transmit extracted information to a particular computing device depending on the type of information extracted. For example, image processing module 650 may send information about individuals encountered to computing device 120, so that the user may review the people that were in their environment (e.g., people the user saw and/or met). Conversely, image processing module 650 may send information about product usage and occurrences of logos to server 250, so that an entity, such as a merchant or financial service provider, may use the information to determine particular offers to make to the user, to collect statistical information about product usage, make product sales predictions, etc. It should be understood, however, that these are merely examples and extracted information may be sent to any computing device for any particular purpose.

In process 800, image processing module 650 may be configured to delete one or more stored images and/or stored representations of images from a storage device (e.g., memory 550) in which they are stored (step 846). In this way, image processing module 650 may extract information and then delete the associated image data to create storage space for additional data. It should be understood, however, that some images and/or stored representations of images may not be deleted (or at least not deleted for a period of time), and instead saved in storage and/or transferred to another device (e.g., computing device 250). In this way, some images and/or stored representations of images may be saved and used for future tasks (e.g., viewing an associated video, quality control, etc.).

Through process 800, apparatus 110 may divide processing between various processing modes, depending on a state of apparatus 110. These processing modes may allow efficient allocation of power, since mobile power source 520 may provide a particular amount of power for processing before requiring recharging. For example, processing that can be accomplished when apparatus 110 is not in use and without affecting the functionality of apparatus 110 may be accomplished during a mode in which apparatus 110 is connected to station 210 and/or external power source 580 (e.g., the second state). This processing may include extraction of information from stored images and/or stored representations of images. In addition, certain processing, such as identification of triggers and/or events that indicate that a capturing parameter should be adjusted, may be performed while apparatus 110 is running on mobile power source 520 (e.g., the first state), since these processes may be needed to provide certain functionality of apparatus 110 (e.g., dynamically adjusting data size of captured images depending on the situation).

In one example of process 800 in which an image or a representation of an image is processed through first processing-mode 830 and second processing-mode 840, processing may be divided between separate processors 540a and 540b. For example, processor 540a may perform first processing-mode 830 and processor 540b may perform second processing-mode 840. As shown in FIGS. 5A and 5C, processor 540a may be a component of apparatus 110 and processor 540b may be a component of a managing apparatus, such as station 210 (FIG. 5A) or computing device 120 (FIG. 5C).

Apparatus 110 may perform at least a portion of process 800, such as to determine a state of apparatus 110 (step 810) and select a processing mode (step 820). If first processing-mode 830 is selected, apparatus 110 may capture a plurality of images from an environment of a user (step 832), process the plurality of images to determine a value of at least one capturing parameter for use in capturing subsequent images (step 834), and store the plurality of images and/or representations of the plurality of images in a storage device (e.g., memory 550) (step 838). As has been described, processor 540a (via identification module 610 and/or capturing module 620, for example) may determine the value of the at least one capturing parameter by identifying one or more visual triggers in a captured image and comparing a representation of the visual trigger with a plurality of stored representations to find a match and/or based on the state of mobile power source 520. Processor 540a may perform processing associated with first processing-mode 830 such that apparatus 110 may dynamically adjust capturing parameters according to various triggers and/or events that occur and/or other information (e.g., available storage space and/or electric power).

At some point (e.g., in the evening after a user returns home), apparatus 110 may be connected to a managing apparatus (e.g., station 210 and/or computing device 120), which may allow apparatus 110 to determine that apparatus 110 is in the second state and to communicate with the managing apparatus and processor 540b to perform processing corresponding to second processing-mode 840. For example, processor 540b may process a plurality of stored images and/or stored representations of a plurality of images to extract information from the image data stored in the storage device (e.g., memory 550) (step 842). After the information has been extracted, processor 540b may send the extracted information to a computing device (e.g., computing device 120, station 210, server 250) (step 844) and/or processor 540b may delete the image data (step 846). In addition, the managing apparatus may be configured to charge mobile power source 520 (e.g., station 210 configured to charge mobile power source 520 with external power source 580 through power connections 510a and 510b).

In some embodiments, the managing device (e.g., computing device 120, station 210, and/or server 250) may be configured to extract information from a plurality of images or representations of a plurality images, send the information to a computing device, and delete the images or representations of the images through communication with processor 540, whether or not processing is done locally through processor 540b. For example, server 250 may communicate with apparatus 110 over network 240 wirelessly to perform processing (e.g., second processing-mode 240). In addition, the managing apparatus may be configured to delete one or more of the plurality of images or stored representations of the plurality of images after extracting information without receiving instructions from the user.

Through performance of process 800, apparatus 110 and a managing device (e.g., computing device 120, station 210, server 250) may divide processing into separate modes. In this way, power-consuming tasks, such as image processing and data communication (e.g., transmitting of extracted information to server 250) may be performed when an additional power source (e.g., external power source 580) is available. This may allow for efficient use of mobile power supply 520, which may allocate power to other tasks that are more useful when apparatus 110 is worn and in-use (e.g., capturing image data).

For example, mobile power supply 520 may be used to provide power for processes that may be used for adjusting image capturing parameters, adjusting hardware components of apparatus 110, deciding which image data to store, outputting of information (e.g., audible indicators. OCR reading of text), and receiving non-visual input (e.g., audible input). Similarly, there may be sufficient power available for certain image processing that may need to be performed when apparatus 110 is in use. For example, apparatus 110 may be configured such that captured images may be analyzed for triggers (visual and non-visual) that may affect the way that subsequent images are to be captured. Performing more detailed image processing and data communications through separate processing may allow these and other functions to be performed more efficiently and consistently.

Further, while separate processing has been described with respect to apparatus 110 and a managing device, it should be understood that any device may be configured to perform any of the processing described herein. Further, processing of an image may be completed by more than one device. For example, apparatus 110 may start particular processing of an image (e.g., to identify the face of an individual), which may be completed by a managing device (e.g., by identifying the identity of the individual through face recognition). The separation and allocation of processing is not limited to a particular arrangement.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks, floppy disks, or CD ROM, or other forms of RAM or ROM, USB media, DVD, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A wearable apparatus for capturing and processing images, the wearable apparatus comprising:
   a wearable image sensor configured to capture a plurality of images from an environment of a user; and
   at least one processing device configured to:
   in a first processing-mode, process the plurality of images to determine a value of at least one capturing parameter for use in capturing at least one subsequent image; and
   in a second processing-mode, process the plurality of images to extract information; and
   wherein the at least one processing device operates in the first processing-mode when the wearable apparatus is powered by a mobile power source included in the wearable apparatus and operates in the second processing-mode when the wearable apparatus is powered by an external power source.

2. The wearable apparatus of claim 1, wherein the at least one capturing parameter determined in the first processing-mode includes at least one of the following: an image resolution, a scaling parameter, a cropping parameter, a compression ratio, a frame rate, a focus point, an exposure time, an aperture size, and a light sensitivity.

3. The wearable apparatus of claim 1, wherein the at least one processing device is further configured to:
   in the first processing-mode, determine the value of the at least one capturing parameter based on at least one visual trigger identified in the plurality of images.

4. The wearable apparatus of claim 3, wherein the at least one visual trigger identified in the first processing-mode includes at least one of the following: an individual, an object, an activity, a location, a logo, a text, and a document.

5. The wearable apparatus of claim 1, wherein the at least one processing device is further configured to:
   in the first processing-mode, determine the value of the at least one capturing parameter based on at least one event identified in the plurality of images.

6. The wearable apparatus of claim 5, wherein the at least one event identified in the first processing-mode includes at least one of the following: meeting with an individual, visiting a known location, entering a vehicle, leaving a vehicle, interacting with an object, participating in a sport activity, and eating a meal.

7. The wearable apparatus of claim 1, wherein the at least one processing device is further configured to:
   in the second processing-mode, cause the extracted information to be sent to a computing device.

8. The wearable apparatus of claim 7, wherein the computing device includes a smartphone and the wearable apparatus sends the extracted information to the computing device using a transmitter.

9. The wearable apparatus of claim 7, wherein the computing device includes an Internet server and the wearable apparatus sends the extracted information to the computing device using an Internet connection.

10. The wearable apparatus of claim 1, wherein the information extracted in the second processing-mode includes information identifying one or more occurrences of a product in the environment of the user.

11. The wearable apparatus of claim 1, further comprising a memory, and wherein the at least one processing device is further configured to:
    in the first processing-mode, store the plurality of images in the memory; and
    in the second processing-mode, after extracting the information, delete one or more of the plurality of images from the memory.

12. A system for capturing and processing images, the system comprising:
    a wearable apparatus including an image sensor, a memory, and a first processing device, wherein, when the wearable apparatus is powered by a mobile power source included in the wearable apparatus, the wearable apparatus is configured to:
    capture a plurality of images from an environment of a user;
    store the plurality of images in the memory; and
    process the plurality of images to determine a value of at least one capturing parameter for use in capturing at least one subsequent image; and
    a managing apparatus including a second processing device, wherein when the managing apparatus communicates with the wearable apparatus, the managing apparatus is configured to:
    process the plurality of images to extract information from at least one of the plurality of images stored in the memory; and
    delete the at least one of the plurality of images from the memory.

13. The system of claim 12, wherein the wearable apparatus is configured to determine the value of at least one capturing parameter by identifying at least one visual trigger and comparing a representation of the at least one visual trigger with a plurality of stored representations of visual triggers to find a match.

14. The system of claim 12, wherein the wearable apparatus is further configured to change the at least one capturing parameter based on a state of the mobile power source.

15. The system of claim 12, wherein the at least one capturing parameter determined by the wearable apparatus includes at least one of the following: an image resolution, a scaling parameter, a cropping parameter, a compression ratio, a frame rate, a focus point, an exposure time, an aperture size, and a light sensitivity.

16. The system of claim 12, wherein the managing apparatus is further configured to charge the mobile power source.

17. The system of claim 12, wherein the managing apparatus is further configured to cause the extracted information to be sent to a computing device.

18. A wearable apparatus for capturing and processing images, the wearable apparatus comprising:
a wearable image sensor configured to capture a plurality of images from an environment of a user,
a memory configured to store the plurality of images; and
at least one processing device configured to, when the wearable apparatus is powered by a mobile power source included in the wearable apparatus, process the plurality of images to determine a value of at least one capturing parameter for use in capturing at least one subsequent image; and
wherein the at least one processing device is further configured to communicate with a managing apparatus, and the managing apparatus is configured to process the plurality of images to extract information from at least one the plurality of images stored in the memory and delete the at least one of the plurality of images from the memory.

19. The wearable apparatus of claim 18, wherein the information extracted by the managing apparatus includes information identifying one or more occurrences of a product in the environment of the user.

20. The wearable apparatus of claim 18, wherein the information extracted by the managing apparatus includes information identifying one or more occurrences of a logo in the environment of the user.

21. The wearable apparatus of claim 18, wherein the information extracted by the managing apparatus includes information associated with the user's exposure to product families or the user's product-usage habits.

22. The wearable apparatus of claim 18, wherein the managing apparatus is further configured to search the plurality of images for a predefined object.

23. The wearable apparatus of claim 18, wherein the managing apparatus is further configured to cause one or more of the plurality of images to be sent to a computing device.

24. The wearable apparatus of claim 18, wherein the managing apparatus is further configured to delete the one or more of the plurality of images after extracting the information and without receiving instructions from user.

25. The wearable apparatus of claim 18, wherein the wearable apparatus is further configured to communicate with the managing apparatus over a network wirelessly.

26. A non-transitory computer readable medium comprising instructions, which when executed by at least one processing device cause the at least one processing device to perform operations comprising:
processing, in a first processing-mode, a plurality of images of an environment of a user to determine a value of at least one capturing parameter for use in capturing at least one subsequent image;
processing, in a second processing-mode, the plurality of images to extract information; and
wherein the at least one processing device operates in the first processing-mode when a wearable apparatus that includes the at least one processing device is powered by a mobile power source included in the wearable apparatus and operates in the second processing-mode when the wearable apparatus is powered by an external power source.

27. The non-transitory computer readable medium of claim 26, wherein the information extracted in the second processing-mode includes information identifying one or more occurrences of a product type in the environment of the user.

28. The non-transitory computer readable medium of claim 26, wherein the information extracted in the second processing-mode is sent to a computing device.

29. The non-transitory computer readable medium of claim 26, wherein determining the value of at least one capturing parameter includes identifying at least one visual trigger and comparing a representation of the at least one visual trigger with a plurality of stored representations of visual triggers to find a match.

* * * * *

UNITED STATES PATENT AND TRADEMARK OFFICE
CERTIFICATE OF CORRECTION

| | | |
|---|---|---|
| PATENT NO. | : 8,957,988 B2 | Page 1 of 1 |
| APPLICATION NO. | : 14/161332 | |
| DATED | : February 17, 2015 | |
| INVENTOR(S) | : Yonatan Wexler et al. | |

It is certified that error appears in the above-identified patent and that said Letters Patent is hereby corrected as shown below:

In The Claims

In Claim 24, column 28, line 10, "from user" should read --from the user--.

Signed and Sealed this
Twenty-ninth Day of September, 2015

Michelle K. Lee
*Director of the United States Patent and Trademark Office*